US011102283B2

(12) United States Patent
Haggart et al.

(10) Patent No.: US 11,102,283 B2
(45) Date of Patent: Aug. 24, 2021

(54) SYSTEMS AND METHODS FOR CLOUD MIGRATION READINESS

(71) Applicant: Virtual Instruments Corporation, San Jose, CA (US)

(72) Inventors: Rick Haggart, Mountain View, CA (US); Rangaswamy Jagannathan, San Jose, CA (US); Michael Bello, Mountain View, CA (US); Ricardo A. Negrete, Scotts Valley, CA (US); Elizaveta Tavastcherna, San Jose, CA (US); Vitoo Suwannakinthorn, San Jose, CA (US)

(73) Assignee: Virtual Instruments Worldwide, Inc., San Jose, CA (US)

(*) Notice: Subject to any disclaimer, the term of this patent is extended or adjusted under 35 U.S.C. 154(b) by 0 days.

(21) Appl. No.: 16/794,174

(22) Filed: Feb. 18, 2020

(65) Prior Publication Data

US 2020/0267216 A1    Aug. 20, 2020

Related U.S. Application Data

(60) Provisional application No. 62/806,696, filed on Feb. 15, 2019.

(51) Int. Cl.
*H04L 29/08* (2006.01)
*H04L 12/26* (2006.01)

(52) U.S. Cl.
CPC .......... *H04L 67/1008* (2013.01); *H04L 43/04* (2013.01); *H04L 43/065* (2013.01); *H04L 67/16* (2013.01)

(58) Field of Classification Search
CPC .................................................. H04L 67/1008
See application file for complete search history.

(56) References Cited

U.S. PATENT DOCUMENTS

| 7,254,114 B1 | 8/2007 | Turner |
| 2014/0007121 A1* | 1/2014 | Caufield ................. G06F 9/505 718/103 |

(Continued)

OTHER PUBLICATIONS

International Application No. PCT/US2020/018710, International Search Report and Written Opinion dated Aug. 11, 2020.

*Primary Examiner* — Adnan M Mirza
(74) *Attorney, Agent, or Firm* — Ahmann Kloke LLP

(57) ABSTRACT

A method comprising discovering workload attributes and identify dependencies, receiving utilization performance measurements including memory utilization measurements of at least a subset of workloads, grouping workloads based on the workload attributes, the dependencies, and the utilization performance measurements into affinity groups, determining at least one representative synthetic workload for each affinity group, each representative synthetic workload including a time slice of a predetermined period of time when there are maximum performance values for any number of utilization performance measurements among virtual machines of that particular affinity group, determining at least one cloud service provider (CSP)'s cloud services based on performance of the representative synthetic workloads, and generating a report for at least one of the representative synthetic workloads, the report identifying the at least one of the representative synthetic workloads and the at least one CSP's cloud services including cloud workload cost.

19 Claims, 25 Drawing Sheets

(56) References Cited

U.S. PATENT DOCUMENTS

| | | | |
|---|---|---|---|
| 2014/0012561 A1* | 1/2014 | Chang | G06F 11/3461 |
| | | | 703/22 |
| 2017/0109212 A1 | 4/2017 | Gaurav | |
| 2019/0207837 A1 | 7/2019 | Malhotra | |
| 2019/0207860 A1 | 7/2019 | York | |

* cited by examiner

| VMs Traffic | Total Mb/s | VM Incoming Mb/s | VM outgoing Mb/s |
|---|---|---|---|
| vm to external | 1.26 | 1.16 | 0.1 |
| vm to internal | 952.91 | 187.89 | 765.02 |
| vm to vm | 8.56 | 8.56 | 8.56 |
| Total Traffic to VMs | 962.73 | 197.61 | 773.68 |

| | A | B | C | D |
|---|---|---|---|---|
| 1 | DateTime | VI-SVCS-VW-VM007-5 | DateTime | VI-SVCS-VW-VM03 |
| 2 | | | | |
| 3 | 11/16/2017 12:00 AM PST | 69.781 | 11/16/2017 12:00 AM PST | 103.4496 |
| 4 | | | | |
| 5 | 11/16/2017 12:05 AM PST | 6.5768 | 11/16/2017 12:05 AM PST | 0.1698 |
| 6 | | | | |
| 7 | 11/16/2017 12:10 AM PST | 23.9348 | 11/16/2017 12:10 AM PST | 38.5 |
| 8 | | | | |
| 9 | 11/16/2017 12:15 AM PST | 21.9148 | 11/16/2017 12:15 AM PST | 5.0194 |
| 10 | | | | |
| 11 | 11/16/2017 12:20 AM PST | 100.513 | 11/16/2017 12:20 AM PST | 36.5062 |
| 12 | | | | |
| 13 | 11/16/2017 12:25 AM PST | 75.076 | 11/16/2017 12:25 AM PST | 95.7002 |
| 14 | | | | |
| 15 | 11/16/2017 12:30 AM PST | 2.0136 | 11/16/2017 12:30 AM PST | 53.1338 |
| 16 | | | | |
| 17 | 11/16/2017 12:35 AM PST | 3.3878 | 11/16/2017 12:35 AM PST | 0.122 |
| 18 | | | | |
| 19 | 11/16/2017 12:40 AM PST | 1.0696 | 11/16/2017 12:40 AM PST | 0 |

| Application | Virtual Machines | Azure Instance | Azure Disk Type | Instance Monthly Cost | App Monthly Cost — 1710 |
|---|---|---|---|---|---|
| Analysis | VM014-523-2TB<br>VM016-523-1TB | L8s<br>D4sv3 | P30<br>P15 | $449.28<br>$276.48 | $725.76 |
| Management | VM001-523-64gig | F16v2 | P10 | $937.44 | $937.44 |
| Automation | VM027-522-HF1 | L4s | P40 | $224.64 | $224.64 |
| WinTel1 | Del-030318 | D2sv3 | P20 | $69.12 | $69.12 |
| ... | | | | | |
| WinTel16 | Del-030318 | D2sv3 | P20 | $69.12 | $69.12 |
| Grand Total | | | | | $25,407 |

FIG. 17

Estimated Monthly Cost For One CSP — 2000

| Application | Virtual Machines | Azure Instance | Azure Disk Type | Instance Monthly Cost | App Monthly Cost |
|---|---|---|---|---|---|
| Analysis | VM014-523-2TB | L8s | P30 | $449.28 | $725.76 |
|  | VM016-523-1TB | D4sv3 | P15 | $276.48 |  |
| Management | VM001-523-64gig | F16v2 | P10 | $937.44 | $937.44 |
| Automation | VM027-522-HF1 | L4s | P40 | $224.64 | $224.64 |
| WinTel1 | Del-030318 | D2sv3 | P20 | $69.12 | $69.12 |
| ⋮ |  |  |  |  |  |
| WinTel16 | Del-030318 | D2sv3 | P20 | $69.12 | $69.12 |
| Grand Total |  |  |  |  | $25,407 |

FIG. 20

SYSTEMS AND METHODS FOR CLOUD MIGRATION READINESS

CROSS-REFERENCE TO RELATED APPLICATIONS

The present application claims benefit of U.S. Provisional Patent Application Ser. No. 62/806,696, filed Feb. 15, 2019, and entitled "Systems and Methods for Cloud Migration Readiness," which is incorporated by reference herein.

FIELD OF THE INVENTION(S)

Embodiments of the present invention(s) generally relate to cloud migration readiness for enterprise systems and, in particular, assessing and reporting challenges associated with transitioning and running all or part of enterprise systems to cloud systems.

BACKGROUND

Complexity of enterprise networks has increased to a point where even information technology (IT) administrators may not have a clear picture of the network utilization of the enterprise network. Enterprise networks are increasingly moving towards a combination of on-premise and cloud-based infrastructure or making the ability to determine computing and storage resources associated with the business-related application more difficult.

To migrate some or all parts of an enterprise network onto a cloud-based infrastructure usually requires IT administrators to rewrite or customize the code for enterprise network applications such as email service, web service, database, customer relationship management (CRM), data file, virtual desktop infrastructure (VDI), enterprise resource planning (ERP) to resources offered by a cloud provider. Such approaches can turn into unproductive and costly endeavors due to time-consuming post re-configurations, failure to achieve the original workload performance, or unnecessary overprovisioning of resources.

In other instances, an enterprise may take the "lift and shift" approach, in which the enterprise makes minimal or zero changes to the code for enterprise network applications. In such instances, the IT administrator may lift the storage requirements of the on-premises infrastructure and shift or replicate the storage requirements in the cloud-based infrastructure. This may result in an over-estimation of required cloud resources and would run contrary to an overall goal of an enterprise of profitability. Every corporation must strike a balance between the cost of additional storage versus performance, reliability, and redundancy benefits of the additional storage resources.

Another approach is to choose the right on-premise configurations before migration. Although this approach is an improvement over replicating the existing on-premise configuration, this approach does not lead directly to a right-sized cloud configuration. The CSPs use high scalable and heavily customized hypervisors. CPUs, memory, and IOPs performance will vary significantly between on-premise and CSPs hypervisors. The outcome of current approaches results in migration projects that take longer and cost more than expected and, in many cases, leads to costly failures.

SUMMARY

An example system comprising at least one process and memory including executable instructions that are executable by the at least one processor to: discover workload attributes and identify dependencies among compute, network, and storage elements of an enterprise system, the enterprise system including any number of networks, applications on servers, and storage devices which are on-premise, receive utilization performance measurements including memory utilization measurements of at least a subset of workloads, each workload including the workload attributes and identified dependencies, group workloads based on the workload attributes, the dependencies, and the utilization performance measurements into affinity groups, determine at least one representative synthetic workload for each affinity group, each representative synthetic workload including a time slice of a predetermined period of time when there are maximum performance values for any number of utilization performance measurements among virtual machines of that particular affinity group, determine at least one cloud service provider (CSP)'s cloud services based on performance of the representative synthetic workloads, and generate a report for at least one of the representative synthetic workloads, the report identifying the at least one of the representative synthetic workloads and the at least one CSP's cloud services including cloud workload cost, the cloud workload cost being based on a periodic cost associated with executing the at least one of the representative synthetic workload on the at least one CSP's cloud services.

In various embodiments, the utilization performance measurements include CPU utilization measurements. In some embodiments, the group workloads based on the workload attributes, the dependencies, and the utilization performance measurements into the affinity groups comprising utilizing k-means clustering to partition at least the utilization performance measurements into a number of sets so as to minimize a within-cluster sum of squares. In some embodiments, the group workloads based on the workload attributes, the dependencies, and the utilization performance measurements into the affinity groups comprising utilizing k-means clustering to partition at least the utilization performance measurements and the CPU utilization measurements into a number of sets so as to minimize a within-cluster sum of squares. In one embodiment, the discover workload attributes and identify dependencies among compute, network, and storage elements of an enterprise system includes receiving on-premise network data from hardware probes within the enterprise system and determining source and destination of the on-premise network data. In various embodiments, the workload characteristics includes attributes of the entity associated with the workload. In some embodiments, the wherein the executable instructions that are executable by the at least one processor to further: determine cloud virtual machines instance needs for each of the representative synthetic workloads, identify cloud storage disk types for each of the representative synthetic workloads based on the storage devices associated with the respective representative synthetic workload, for each representative synthetic workload, determine periodic cost associated with the cloud virtual machine instances and the cloud storage disk types, wherein the cloud workload cost is based, at least in part, on the periodic cost. In one embodiment, the one or more of the representative synthetic workloads is performed in the at least one CSP's cloud services to assist in determining cloud virtual machine instance needs. In various embodiments, the k-means clustering includes given a set of utilization metrics measurements ($x_1$, $x_2$, ..., $x_n$), where each utilization metrics measurement is a d-dimensional real vector, utilizing k-means clustering to partition n utilization metrics measurement into k($\leq$n) sets S={$S_1, S_2, \ldots, S_k$} so as to minimize a within-cluster sum of squares (WCSS).

An example computer readable medium including instructions, the instructions being executable by a processor to perform a method, the method comprising: discovering workload attributes and identify dependencies among compute, network, and storage elements of an enterprise system, the enterprise system including any number of networks, applications on servers, and storage devices which are on-premise, receiving utilization performance measurements including memory utilization measurements of at least a subset of workloads, each workload including the workload attributes and identified dependencies, grouping workloads based on the workload attributes, the dependencies, and the utilization performance measurements into affinity groups, determining at least one representative synthetic workload for each affinity group, each representative synthetic workload including a time slice of a predetermined period of time when there are maximum performance values for any number of utilization performance measurements among virtual machines of that particular affinity group, determining at least one cloud service provider (CSP)'s cloud services based on performance of the representative synthetic workloads, and generating a report for at least one of the representative synthetic workloads, the report identifying the at least one of the representative synthetic workloads and the at least one CSP's cloud services including cloud workload cost, the cloud workload cost being based on a periodic cost associated with executing the at least one of the representative synthetic workload on the at least one CSP's cloud services.

A method comprising: discovering workload attributes and identify dependencies among compute, network, and storage elements of an enterprise system, the enterprise system including any number of networks, applications on servers, and storage devices which are on-premise, receiving utilization performance measurements including memory utilization measurements of at least a subset of workloads, each workload including the workload attributes and identified dependencies, grouping workloads based on the workload attributes, the dependencies, and the utilization performance measurements into affinity groups, determining at least one representative synthetic workload for each affinity group, each representative synthetic workload including a time slice of a predetermined period of time when there are maximum performance values for any number of utilization performance measurements among virtual machines of that particular affinity group, determining at least one cloud service provider (CSP)'s cloud services based on performance of the representative synthetic workloads, and generating a report for at least one of the representative synthetic workloads, the report identifying the at least one of the representative synthetic workloads and the at least one CSP's cloud services including cloud workload cost, the cloud workload cost being based on a periodic cost associated with executing the at least one of the representative synthetic workload on the at least one CSP's cloud services.

BRIEF DESCRIPTION OF THE DRAWINGS

FIG. 15 is a table comprising a temporal data capturing utilization levels of an example workload according to some embodiments.

FIG. 17 is a chart depicting cloud configuration and the cost of example applications of the enterprise network according to some embodiments.

FIG. 20 depicts an example output of the CMR playback phase according to some embodiments.

DETAILED DESCRIPTION

Figure 1:
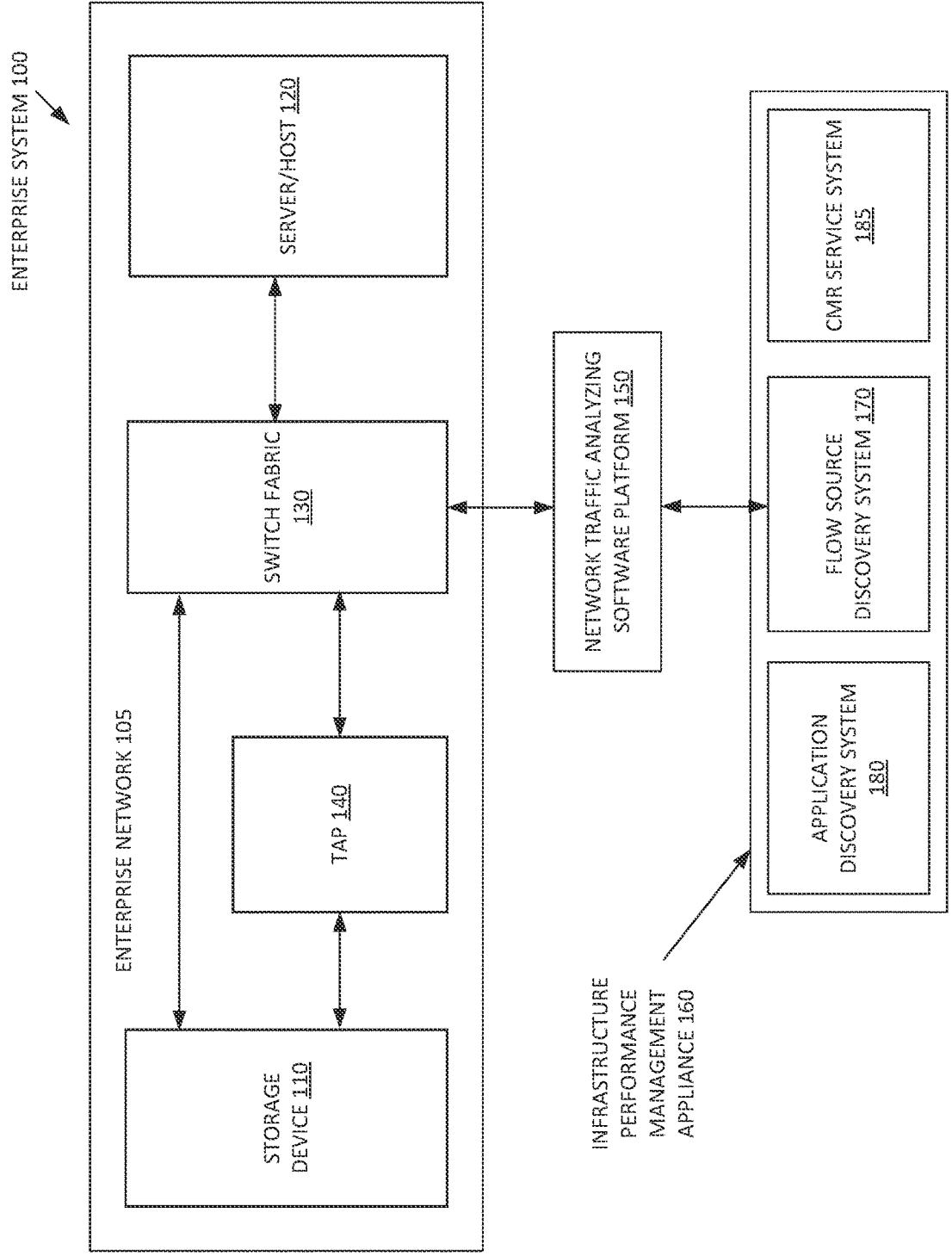
FIG. 1 depicts a block diagram of a cloud migration readiness (CMR) service system which discovers, profiles, and performs playback for migration of one or more entities of the enterprise network onto a cloud service provider (CSP).

Various embodiments leverage performance analytics, workload utilization profiling, and cloud simulation to determine which workloads of the enterprise network can be migrated to a cloud infrastructure as a service (IasS) and their associated cost. As a result, these systems may provide insight into the performance and suitability of applications of the enterprise network in different cloud service providers (CSP)s. For example, systems discussed herein may reduce the risk of large-scale migrations of workloads or applications to a public and/or private cloud before migrating the actual workloads to the cloud.

The "end to end" migration process to an Infrastructure as a Service (IaaS) cloud is a challenging undertaking consisting of many critical phases and spanning IT infrastructure and application organizations. "Lift and Shift" or "Re-hosting" migrations to the cloud are inherently risky due to many unknown answers to fundamental yet, critical questions. In "lift and shift" migrations, the enterprise may utilize applications in the cloud that are effectively a clone of the existing data center implementation. In the "re-hosting" migration, the application may be similar to the existing data center implementation, but individual services may be replaced with cloud-native services. In some embodiments, there may be a combination of the two where some applications are a clone of the existing data center implementation while others are replaced with cloud-native services.

A common approach to cloud migration is to replicate the existing on-premise configuration in the cloud. Such approaches can turn into unproductive and costly endeavors due to time-consuming post re-configurations, failure to achieve the original workload performance, or unnecessary overprovisioning of resources. In many cases, the outcome may be repatriation back to the on-premise data center.

Another approach is to right-size the on-premise configurations before migration. Although this approach is an improvement over replicating the existing on-premise configuration, it still does not lead directly to a right-sized cloud configuration. The CSPs use high scalable and heavily customized hypervisors. CPUs, memory, and IOPs performance will vary significantly between on-premise and CSPs hypervisors.

In the absence of workload simulation, workload performance can only be verified by moving the actual application to the cloud and there is no guarantee that the CSP will support the resource demands of the workloads and deliver acceptable performance.

Even if cloud configurations adjustments are made to the original workloads after the migration, the operating cost may be significantly higher than expected which could lead to repatriation due to an unsustainable and unjustifiable investment.

The outcome of current approaches results in projects that take longer and cost more than expected and, in many cases, leading to very costly failures.

Some embodiments described herein include a unique consultative iterative approach to the discovery and understanding of the workload's or application's dependencies. Some embodiments blend a consultative approach that leverages an agile data discovery, data manipulation, and analysis implemented by experienced data scientists together with automation. In one example, the approach may be designed to handle the initial surge of raw and unstructured data collected during the first iteration. During the following iterations, focus may be gradually tuned to the priorities and data characteristics revealed during each iteration. By the third iteration, the dependency mapping may be stable and available to create the "move groups" and "move events." After the final iteration, customers may be offered the option to access a SaaS platform to continue the dependency mapping data manipulation.

In one example, a system may identify and determine workload characteristics, baseline on-premises service level agreements (SLAs), and dependencies between compute, networking, and storage elements of the enterprise network. The system may then identify workloads of the enterprise network and categorize them into affinity groups which are used to create synthetic workloads. A synthetic workload on CSP profiles may be used to simulate the synthetic workload on different CSPs to estimate the performance and cost of migrating the workload onto different CSPs. In some embodiments, after the customer chooses a particular CSP, the system may monitor actual workloads after the cloud migration to identify unforeseen performance or capacity issues.

A cloud migration readiness (CMR) service system may be used to give IT administrators an awareness of the dependencies of the various elements of the enterprise system. For example, the CMR service system may utilize an application discovery system and flow source discovery system to analyze the performance of applications of the enterprise network and profile workload utilization to determine workloads that may be migrated to a CSP.

The application discovery system may give IT administrators and operators awareness of applications and related network infrastructure. The system may obtain real-time views of the infrastructure that is relevant to the network and usage of the network. In addition, the application discovery system may determine entities of the infrastructure where important applications are located, monitor application behavior, and assess/monitor their effect on infrastructure resources. The CMR service system may utilize the output of the application discovery system to provide real-time visibility into the performance, health, and utilization of applications across physical, virtual, and cloud computing environments.

Flow source discovery system may collect traffic data in the form of data packets from a wide variety of routers and switches manufactured by different companies. The results of the data flow source discovery process may be used to detect network anomalies, control bandwidth utilization, optimize application performance, and/or troubleshoot problems. Examples of network anomalies include DDoS attacks, SPAM, BotNets, abnormal downloads/uploads, or the like. The data flow source discovery system may control bandwidth utilization by monitoring data traffic metrics, and providing alarms or alerts for various data traffic metrics such as read response time, fabric transmission errors, link errors, link transmission errors, network usage rate, port utilization, etc. The CMR service system may utilize the output of the flow source discovery system to determine a traffic dependency of internal and external entities of the enterprise network.

FIG. 1 depicts a block diagram of an enterprise system 100, including a CMR service system 185, capable of simulating a synthetic workload on different CSPs to estimate the performance and cost of migrating one or more applications of the enterprise network onto different CSPs. In this example, the enterprise system 100 comprises an enterprise network 105, a network traffic analyzing software platform 150, and an infrastructure performance management (IPM) appliance 160. The enterprise network 105 includes a storage device 110, a server/host 120, a switch fabric 130, and traffic access points (TAP) 140. The IPM appliance 160 includes a flow source discovery system 170, an application discovery system 180, and the CMR service 185.

Storage devices 110 of the enterprise system 100 includes any number of storage devices that store data. In one embodiment, the storage devices 110 include one or more disk arrays. For example, the storage devices 110 may include a storage array network (SAN). In various embodiments, the storage device is cloud storage.

Server/host 120 may be any digital device with an instance of an operating system. For example, any number of hosts 120 may be a physical computer managed by Microsoft Windows. Hosts 120 may include instances of UNIX, Red Hat, Linux and/or others. The hosts 120 may include one or more virtual machines.

The switch fabric 130 may provide communication between any two entities of the enterprise system 100, such as the storage devices 110, the server/host 120, the TAP 140, and the network traffic analyzing software platform 150. The switch fabric 130 may use packet switching to receive, process, and forward data from a source device to a destination device. The switch fabric 130 may refer to switches (e.g., flow sources) that are used to direct and assist in the communication of information of the enterprise network 105.

The TAP 140 may provide connectivity to links between storage ports of the storage device 110 and switches of the switch fabric 130. In various embodiments, the TAP 140 may provide connectivity on both sides of fabric-based storage virtualizers. In one example, the TAP 140 is an optical splitter that provides a copy of data passing through a fiber optic channel of the enterprise network 105 without affecting the integrity of the data. In this example, the fiber optic channel may connect storage devices (of a SAN) with servers of the enterprise network. The copy of the data may be used for real-time performance monitoring of traffic traveling through the fiber optic channel and/or to assist with application discovery.

The network traffic analyzing software platform 150 may discover flow sources on the enterprise network 105. The network traffic analyzing software platform 150 may be any third-party platform that is integrated into routers or switches by their respective manufacturers to aid users in monitoring performance of traffic data entering and exiting that specific switching hardware. An example of a network traffic analyzing software platform 150 is Netflow. Although the network traffic analyzing software platform 150 of a particular provider may perform some flow source detection, the network traffic analyzing software platform 150 may provide only limited information about the flow sources (e.g., limited metrics) and may not include other switches of other manufacturers (i.e., that is not a part of that particular providers network traffic analyzing software platform 150).

The application discovery system 180 may receive from the flow source discovery system 170 possible roles of network endpoints. These possible network endpoint roles may be used by the application discovery system 180 to discover applications through heuristic analysis. For example, data received from a known flow source (e.g., discovered by the flow source discovery system 170) may be assessed to determine what applications provided and/or received information from the data. Data received from a known flow source may be, in one example, intercepted or copied from a TAP that interfaces with communication paths of the enterprise network 105. Based on that information as well as the type of communication, the frequency of communication, and/or the like, the application discovery system 180 or the flow source discovery system 170 may label a network endpoint with one or more roles performed within the enterprise network 105. The output of the application discovery system 180 may be a list of applications on the enterprise network, and entities of the enterprise system associated with each of the applications.

The CMR service 185 may utilize data from the network traffic analyzing software platform 150, the flow source discovery system 170, and the application discovery system 180 to identify applications and determine traffic dependency of internal and external entities of the enterprise network. The CMR service 185 may receive the identified application and traffic dependencies of internal and external entities of the enterprise network and categorize workloads of the enterprise network into multiple affinity groups. The CMR service 185 may determine representative synthetic workload for the multiple affinity groups. The CMR service 185 may use simulated cloud service providers and the representative synthetic workload to simulate the representative synthetic workload on different CSPs to estimate the performance and cost of migrating the workload onto different CSPs. During each phase of the cloud migration readiness process, the CMR service 185 may provide a user interface during each phase of the cloud migration readiness process. The user interface may provide a chart depicting traffic dependencies of internal and external network traffic, such as an example chart of FIG. 7A. The cloud migration readiness process may include four phases, a discovery phase, a profiling phase, a playback phase, and a monitor phase. More details of these four phases of the cloud migration readiness process will be discussed in FIG. 3.

The output of the CMR service 185 may be an estimated performance and cost of moving one or more applications or portions of one or more applications. A customer may utilize this information to determine the applications, or portions of the application to migrate to a CSP. After the migration is completed, the CMR service 185 may monitor the workloads associated with the application to identify unforeseen performance or capacity issues.

It will be appreciated that some embodiments may provide a variety of different services beyond cloud migration readiness. For example, the CMR service 185 may provide infrastructure performance assessment. In this example, the CMR service 185 may enable mitigation of the risk of major infrastructure initiatives and optimize infrastructure performance through application discovery, identification of workgroups, categorization of workgroups into affinity groups, creation of representative synthetic workloads, and simulation of the representative synthetic workloads into different representative infrastructure initiatives. This process may provide definitive insight into current and planned workload and performance. Further, this process may be utilized in customer planning technology refreshes, migrations, consolidations, or new deployments.

Further, the CMR service 185 may provide storage performance validation in some embodiments. For example, the CMR service 185 may provide accurate workload modeling and guidance for storage infrastructure validation. Through application discovery, identification of workgroups, categorization of workgroups into affinity groups, creation of representative synthetic workloads, and simulation of the representative synthetic workloads into different representative infrastructure initiatives, the CMR service 185 may enable that accurate application workload validation models may be built to validate storage. This process may be used to enable evaluation and testing of storage infrastructure.

Figure 2:
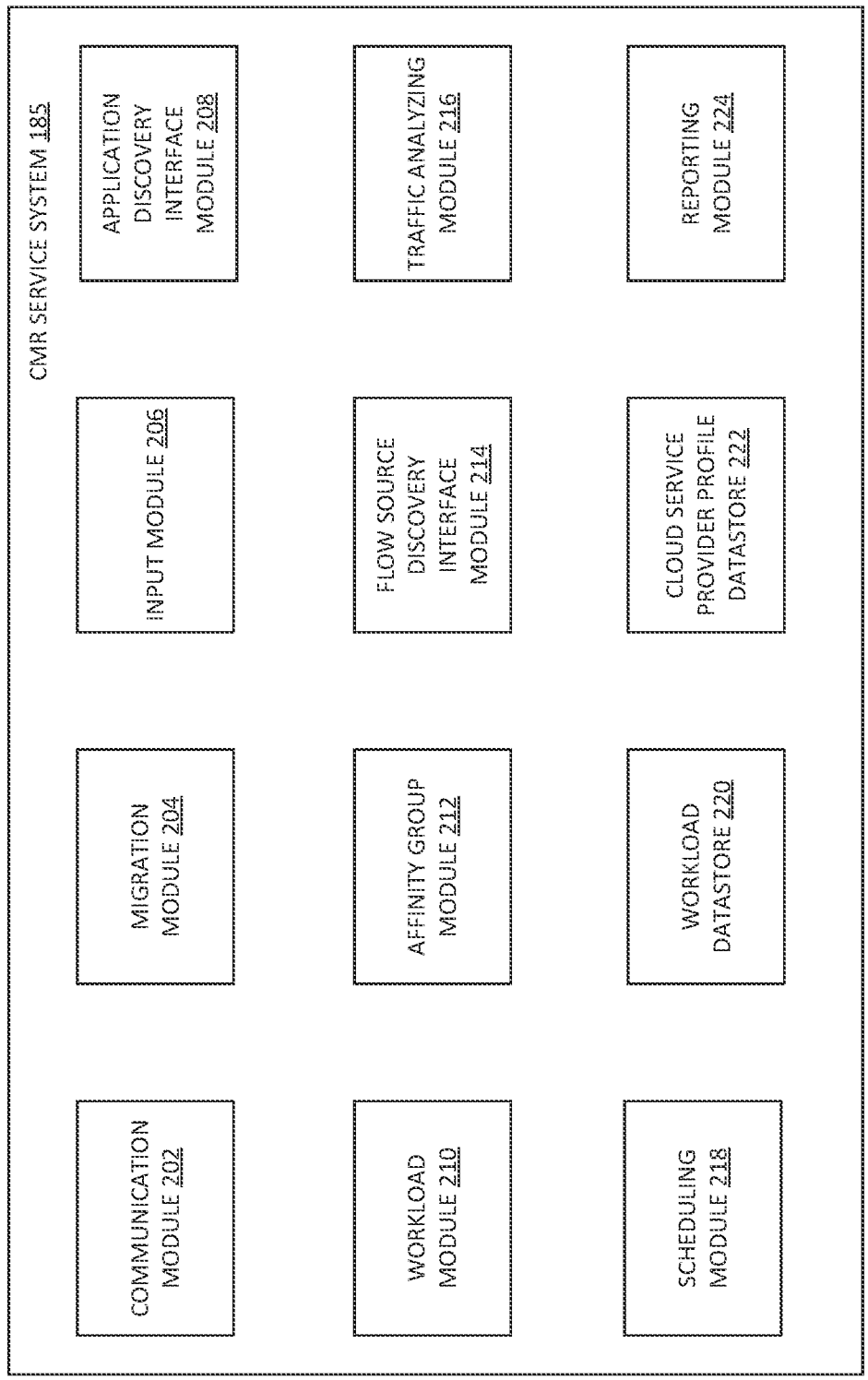
FIG. 2 depicts a block diagram of an example CMR service system according to some embodiments.

FIG. 2 depicts a block diagram of an example CMR service system 185 according to some embodiments. The CMR service system 185 includes a communication module 202, a migration module 204, an input module 206, an application discovery interface module 208, a workload module 210, an affinity group module 212, a flow source discovery interface module 214, a traffic analyzing module 216, a scheduling module 218, a workload datastore 220, a cloud service provider profile datastore 222, a reporting module 224, and a flow source datastore 226.

The communication module 202 may send and receive requests or data between any of the CMR service system 185, the network traffic analyzing software platform 150, the application discovery system 180, and the flow source discovery system 170. The communication module 202 may receive a request from the IT administrator of the enterprise network 105 to commence the cloud migration readiness process. In some embodiments, the communication module 202 may send a request to the application discovery system 180 for data regarding applications of the enterprise network 105 discovered by the application discovery system 180.

The communication module 202 may receive from the network traffic analyzing software platform 150 any number of data packets and optionally send any number of data packets to the input datastore 218. The communication module 202 may send a request to the flow source discovery system 170 for discovered flow source(s) and their associated attributes (e.g., in a table, chart, graph, or the like). In some embodiments, the communication module 202 may receive a request from the reporting module 224 to provide, in the form of charts or graphs, traffic dependencies of internal and external network traffic.

The migration module 204 may manage the cloud migration readiness process and/or may commence the cloud migration readiness process. The migration module 204 may commence the cloud migration readiness process when the migration module 204 determines that any number of trigger conditions is satisfied. For example, a trigger condition may include the scheduling module 218 determining that a current time equals a scheduled cloud migration readiness process start time. In some embodiments, one of the trigger conditions includes receiving from the input module 206 a request to commence the cloud migration readiness process. Upon the reception of the request to commence the cloud migration readiness process from the scheduling module 218 or the input module 206, the migration module 204 may commence the cloud migration readiness process.

The migration module 204 may suspend the flow source discovery process when the migration module 204 determines that a trigger condition is satisfied. For example, a trigger condition may include the scheduling module 218 determining that a current time equals the scheduled cloud migration readiness process end time. In this example, a scheduling module 218 may determine or be configured to identify a time when resources are being used by the enterprise (e.g., peak times or business hours) which may satisfy the trigger continue to suspend the flow source discovery process (e.g., thereby conserving resources for use by the enterprise. Similarly, there may be a time during the evenings or off-peak times identified by the scheduling module 218 which may trigger a transition from suspend to re-engaging the flow source discovery process. In some embodiments, the migration module 204 may flag or bookmark one or more points (e.g., at suspension points or any point) in the flow source discovery process such that when the process is re-engaged after being suspended, the flow source discovery process may begin at or near the point in the flow source discovery process when the process was suspended.

In some embodiments, one of the trigger conditions includes receiving from the input module 206 a request to suspend the cloud migration readiness process. Upon the reception of the request to commence the flow source discovery from the scheduling module 218 or the input module 206, the migration module 204 may suspend the cloud migration readiness process.

In some embodiments, the migration module 204 manages a commencement or suspension of any one of the multiple phases of the cloud migration readiness process. For example, the migration module 204 may commence the discovery phase of the cloud migration readiness process when the migration module 204 determines that any number of trigger conditions is satisfied. In one embodiment, the discovery phase of the cloud migration readiness process lasts two to four weeks. In various embodiments, the profiling phase lasts two weeks, the playback phase lasts two weeks, and the monitoring phase lasts four weeks.

The input module 206 may initiate the cloud migration readiness process or a phase of the cloud migration readiness process (e.g., based on receiving a request from the IT administrator of the enterprise network 105). In some embodiments, the input module 206 may receive a request to start an application discovery process. In various embodiments, the input module 206 may receive a request to start a flow source discovery process. In some embodiments, the input module 206 receives a schedule of the cloud migration readiness process. For example, the input module 206 may receive a start date and time of the cloud migration readiness process start time. In some embodiments, the input module 206 may receive, from the IT administrator of the enterprise network 105, known workloads.

The application discovery interface module 208 interfaces with the application discovery system 180. In some embodiments, the application discovery interface module 208 may send to the output of the application discovery process to the input module 206. The output of the application discovery process may include a list of application entries found in the enterprise network 105. Each application entry may include attributes or characteristics (e.g., metrics) of the discovered application such as a suggested name of the discovered application as well as attributes associated with the entities which make up the discovered application. The application discovery process will be discussed further in FIG. 5.

During the discovery phase of the cloud migration readiness process, the workload module 210 may identify multiple workloads of the enterprise network 105. In some embodiments, a workload represents the amount of work or processing accomplished by an entity of the enterprise network 105. Entities of the enterprise network 105 may include applications, compute devices, network elements, and storage elements. In some embodiments, entities of the enterprise network include virtual machines.

In various embodiments, a workload may comprise multiple workloads. For example, the workload represents the amount of work or processing accomplished by an application of the enterprise network 105. Thereby, one workload representing the email service application of the enterprise network comprises multiple virtual machine workloads and server workloads, which function as part of the email service application.

In some embodiments, during the discovery phase of the cloud migration readiness process, the workload module 210 may determine characteristics of the workload. Characteristics of the workload may include attributes of the entity associated with the workload. For example, a workload of a virtual machine may include attributes of the virtual machine such as applications of the enterprise network 105 associated with the virtual machine and utilization such as maximum read speed, maximum write speed, central processing unit (CPU) MHz, memory utilization percentage, storage demand, and input/output operations per second (IOPS). For example, a workload of a storage device may include attributes of the storage device such as read and write latency.

In some embodiments, the workload module 210 may send a list of workloads identified by the workload module 210 to the affinity group module 212. The affinity group module 212 may receive the list of workloads and categorize or group some or all of the received workloads into one or more affinity groups. In some embodiments, each workload is categorized into one affinity group. The affinity group module 212 may group any number of workloads into synthetic workloads based, at least in part, on resource utilization (e.g., CPU utilization, memory utilization, storage utilization and/or the like).

The workload module 210 may determine workload interdependencies (e.g., how workloads depend on one another). Workload interdependencies help to determine the sequence of workloads, how services are migrated to the cloud, and what workloads and services should stay on-premise.

The affinity group module 212 may categorize workloads identified by the workload module 210 into affinity groups. As discussed herein, affinity groups (e.g., representative synthetic workloads) may consist of workloads with similar resource utilization levels and temporal or time-based characteristics. For example, workloads with similar read speed and write speeds may be grouped together into the same affinity group. In one example, workloads that have a CPU usage of greater than 90% during a particular time frame each day may be placed in the same affinity groups. In some embodiments, a workload may belong to more than one affinity group. In other embodiments, each workload may only belong to one affinity group.

In one method, the CMR service system 185 may utilize a machine learning algorithm to categorize or group workloads into affinity groups. In some embodiments, the workload module may apply a k-means clustering algorithm to the multiple workloads identified by the workload module 210. The k-means clustering algorithm may have a feature set represented by average, a percentile of maximum values of utilization metrics. In some embodiments, utilization metrics include CPU utilization, memory utilization, input/out (IO) read utilization, IO write utilization, IO number of reads, IO number of writes, network receive rate, and network transmit rate.

In another method, the affinity group module 212 groups workloads by their maximum or percentile utilization metric fitness into available cloud instances for a specific CSP. This method may be utilized when a particular CSP to use has already been determined.

Once the affinity group module 212 determines the workloads that belong to each affinity group, the affinity group module may determine the representative synthetic workload for each affinity group. The representative synthetic workload for each affinity group may be a sum of the multiple workloads which make up the affinity group. In various embodiments, the representative synthetic workload for each affinity group may be a weighted sum of the multiple workloads which make up the affinity group, with each of the multiple workloads given a weight based on attributes or characteristics of the workload. In some embodiments, the affinity group module may send a request to the workload datastore 220 to store the representative synthetic workload associated with each affinity group.

The affinity group module 212 may generate a table or chart which comprises temporal data capturing utilization level for some or all of the utilization metrics. An example of this may be seen in FIG. 15. Table 1500 of FIG. 15 contains temporal data capturing utilization levels of two example workloads of the enterprise network 105. The columns of the example table 1500 are associated pairs of date/time of data and the name of the workload that is being monitored by the infrastructure performance management appliance 160 for a particular utilization metric. The number of column pairs is equal to the number of workloads being monitored by the workload module 212. For example, column 1510 provides a timestamp for measuring the particular utilization metric, while column 1520 provides the measurement for the particular utilization metric associated with the timestamp in the same row.

The flow source discovery interface module 214 interfaces with the flow source discovery system 170. In some embodiments, the flow source discovery interface module 214 may send the output of the flow source discovery process to the input module 206. The output of the flow source discovery process may include a list of flow source entries. The list of flow source entries may include attributes associated with discovered flow sources. Attributes may include the type of flow source, total byte count, incoming/outgoing byte count, incoming/outgoing bit rate, total packet rate, and/or incoming/outgoing endpoint count. In some embodiments, attributes associated with flow source entries may include applications associated with the flow source. The flow source discovery process will be discussed further in FIG. 6. In some embodiments, the flow source discovery interface module 214 interfaces with the network traffic analyzing software platform 150. In some embodiments, the flow source discovery interface module 214 may send a request to the flow source datastore 226 to store the flow source entries.

The traffic analyzing module 216 analyzes network traffic received from the flow source discovery system 170. In some embodiments, the traffic analyzing module 216 receives network traffic from the network traffic analyzing software platform 150. The traffic analyzing module 216 may analyze internet protocol (IP) communications between entities of the enterprise network 105 as well as IP communications between entities of the enterprise network and entities that are external to the enterprise network 105. The traffic analyzing module 216 may provide the output of traffic dependency on internal and external network traffic. An example of this can be seen in FIG. 7A. Example chart 700 depicts the amount and type of traffic that goes through a particular virtual machine. Row 710 depicts the amount of traffic between the particular virtual machine to external entities of the enterprise network 105. Network traffic is separated by incoming and outgoing network traffic. Similarly, row 720 depicts the amount of traffic between the particular virtual machine to other entities, which are not virtual machines, of the enterprise network 105. Row 730 depicts the amount of traffic between the particular virtual machine and other virtual machines of the enterprise network 105. The traffic analyzing module 216 may output the traffic dependency in forms other than a table. An example of this can be seen in FIG. 7B. An example output interface 750 depicts the same information as the example chart 700 of FIG. 7A, but in the form of a state diagram.

Figure 11A:
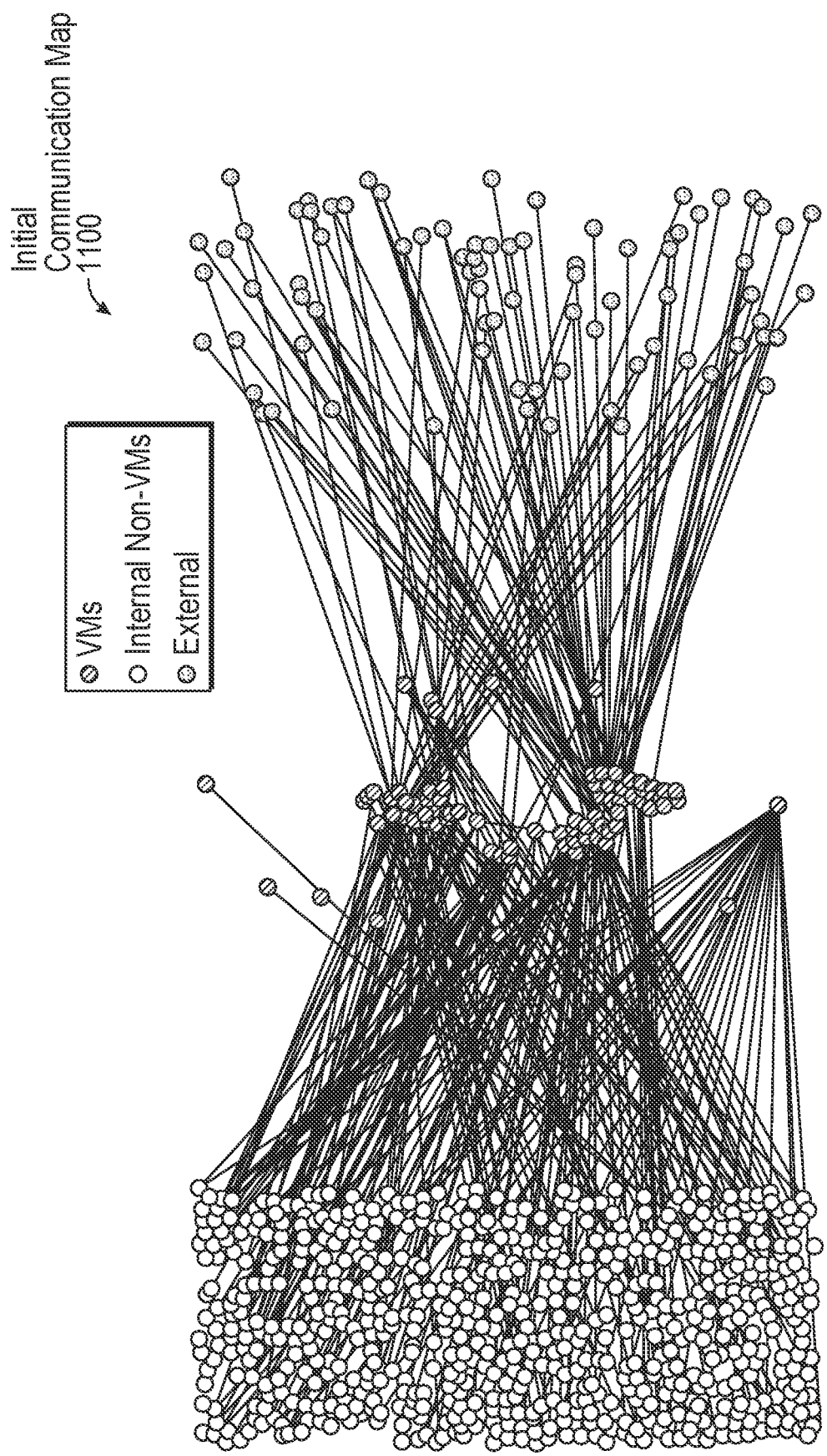
FIG. 11A depicts an initial communication map between internal and external virtual machines according to some embodiments.
Figure 11B:
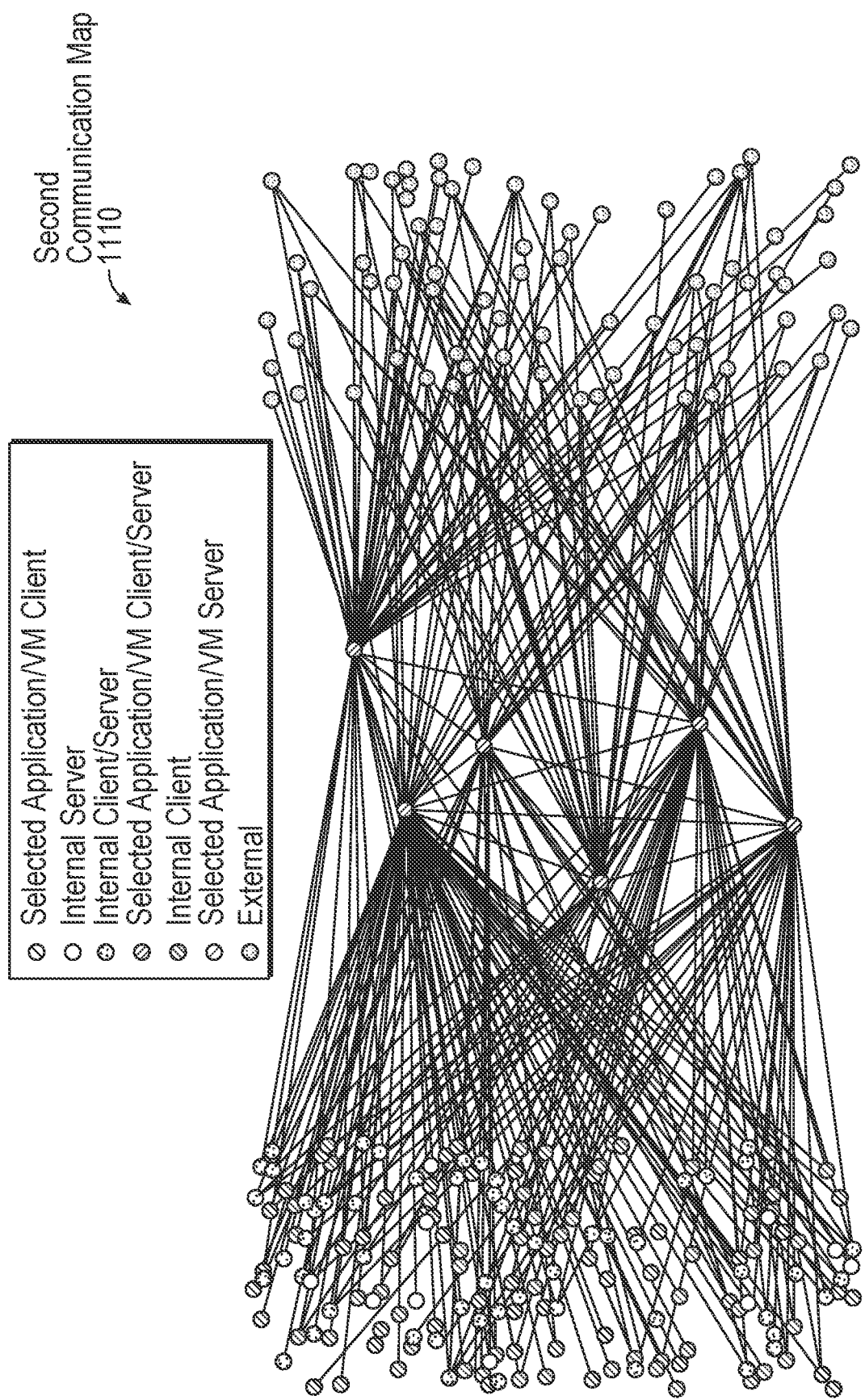
FIG. 11B depicts a second communication map between internal and external virtual machines according to some embodiments.
Figure 11C:
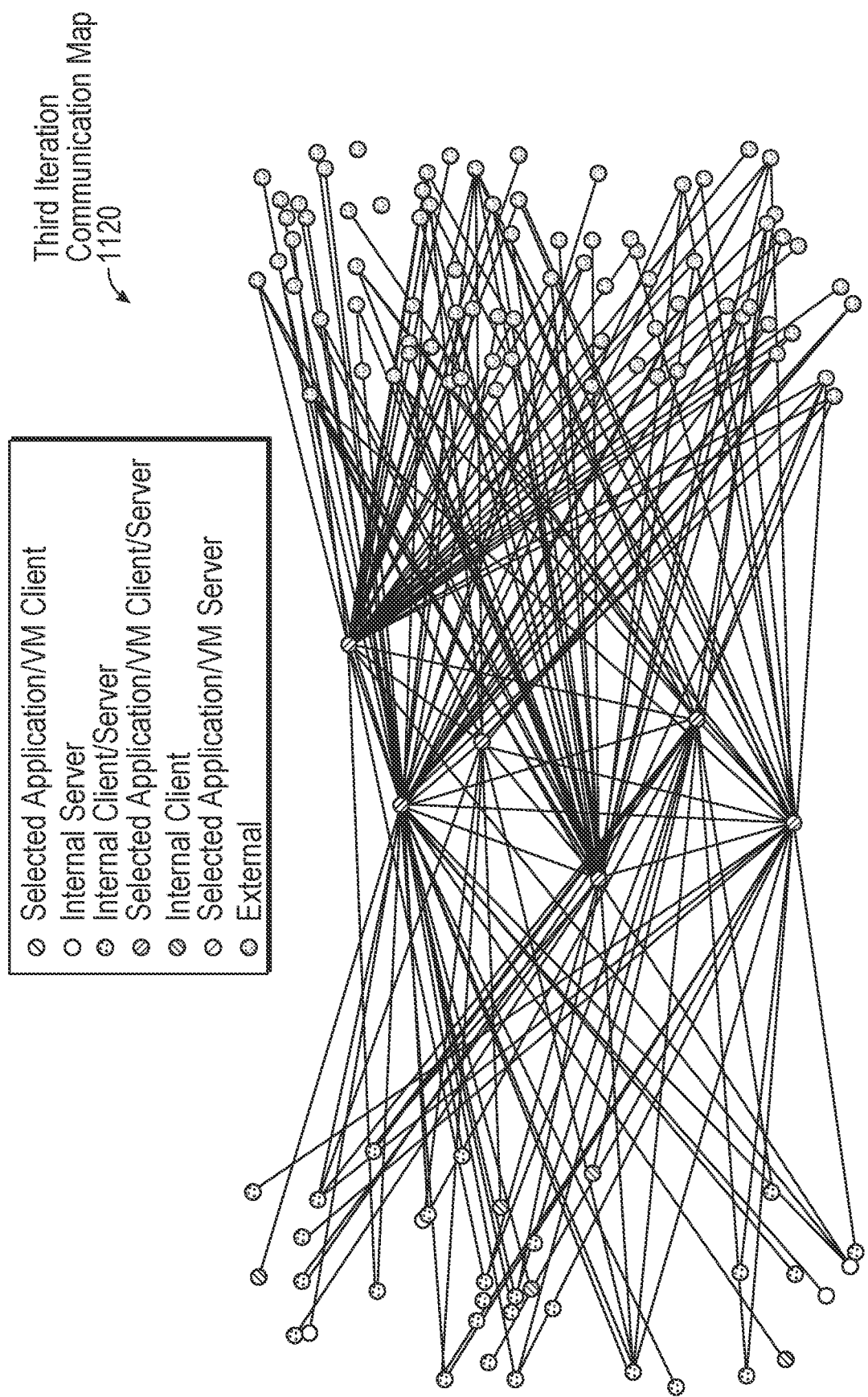
FIG. 11C depicts a third communication map between internal and external virtual machines according to some embodiments.

In one embodiment, the traffic analyzing module 216 may provide a traffic dependency mapping of the various entities or workloads of the enterprise network 105. The dependency mapping of entities or workloads of the enterprise network may be done iteratively. For example, an initial internal and external communication map may be produced and reviewed by a customer or, alternately, the external communication map may be reviewed by an analytical system. The initial communication map may provide an overall view of the enterprise network. The customer or analytical system may review the overall view of the enterprise network to identify and filter entities or workloads which are not of interest and tune priorities and data characteristics reveal during each iteration. An example of an initial communication map may be seen in FIG. 11A. The customer or analytical system may receive an example initial communication map 1100. Subsequent to receiving the initial communication map 1100 of FIG. 11A, the customer or analytical system may refine the IP addresses or entities to focus on a particular set of entities to produce a second communication map 1110 of FIG. 11B. Subsequently, a third iteration of the communication map 1120 of FIG. 11C may be produced. The initial communication map 1100, the second communication map 1110 and the third communication map 1120 may be used to determine or identify bully virtual machines and zombie virtual machines. A bully virtual machine is a virtual machine that utilizes too many resources and causes other virtual machines to be without resources. A bully virtual machine may cause cluster performance to degrade. Identifying bully virtual machines may help in analyzing whether one or more of these virtual machines need additional resources or need to be re-routed to other applications or workloads.

A zombie virtual machine is inactive or is used by very few or no applications or workloads. In one example, a virtual machine is considered a zombie when it is powered on but does fewer than 30 IOPS and receives or transfers fewer than 1000 bytes per day for the past 30 days. To prevent host resource wastage, zombie virtual machines need to be removed or re-routed to other applications or workloads.

In some embodiments, the traffic analyzing module 216 may receive network traffic data from the network traffic analyzing software platform 150 or the flow source discovery system 170 after the network traffic analyzing software platform 150 has performed flow source detection for a predetermined period of time. In some embodiments, the predetermined period of time is at least two weeks.

The scheduling module 218 may receive from the input module 206, the start time or end time of one or more of the phases of the cloud migration readiness process. In some embodiments, the scheduling module 218 may suspend the cloud migration readiness process or any phase of the cloud migration readiness process when any number of trigger conditions is satisfied.

The workload datastore 220 may be any structure and/or structures suitable for storing data entries or records (e.g., an active database, a relational database, a self-referential database, a table, a matrix, an array, a flat file, a documented-oriented storage system, a non-relational No-SQL system, an FTS-management system such as Lucene/Solar, and the like). The workload datastore 220 may store the representative synthetic workload associated with each affinity group. In some embodiments, the workload datastore 220 may create a workload entry for each workload identified by the migration module 204. Each workload entry may include metrics or attributes associated with the workload. The attributes of the workload may depend on what the workload represents. For example, if the workload represents an application, the attributes of the workload may include attributes of the application such as identifiers of the entities associated with the enterprise network 105, tier, or criticality of the application. In another example, if the workload represents a virtual machine, attributes of the workload may include attributes of the virtual machine such as maximum read speed, maximum write speed, central processing unit (CPU) MHz, memory utilization percentage, storage demand, and IOPS.

The cloud service provider profile datastore 222 may be any structure and/or structures suitable for storing data entries or records (e.g., an active database, a relational database, a self-referential database, a table, a matrix, an array, a flat file, a documented-oriented storage system, a non-relational No-SQL system, an FTS-management system such as Lucene/Solar, and the like). The cloud service profile datastore 222 may store a CSP profile entry for various CSPs such as Microsoft Azure, IBM Cloud, and the like. Each CSP profile entry may include attributes of the CSP such as available memory storage, types of security levels available, cost per gigabyte, methods of retrieving data stored on the cloud, and types of deployment available to a consumer. The migration module 204 may utilize the cloud service profile datastore 222 to suggest one or more CSP to the customer.

Figure 8:
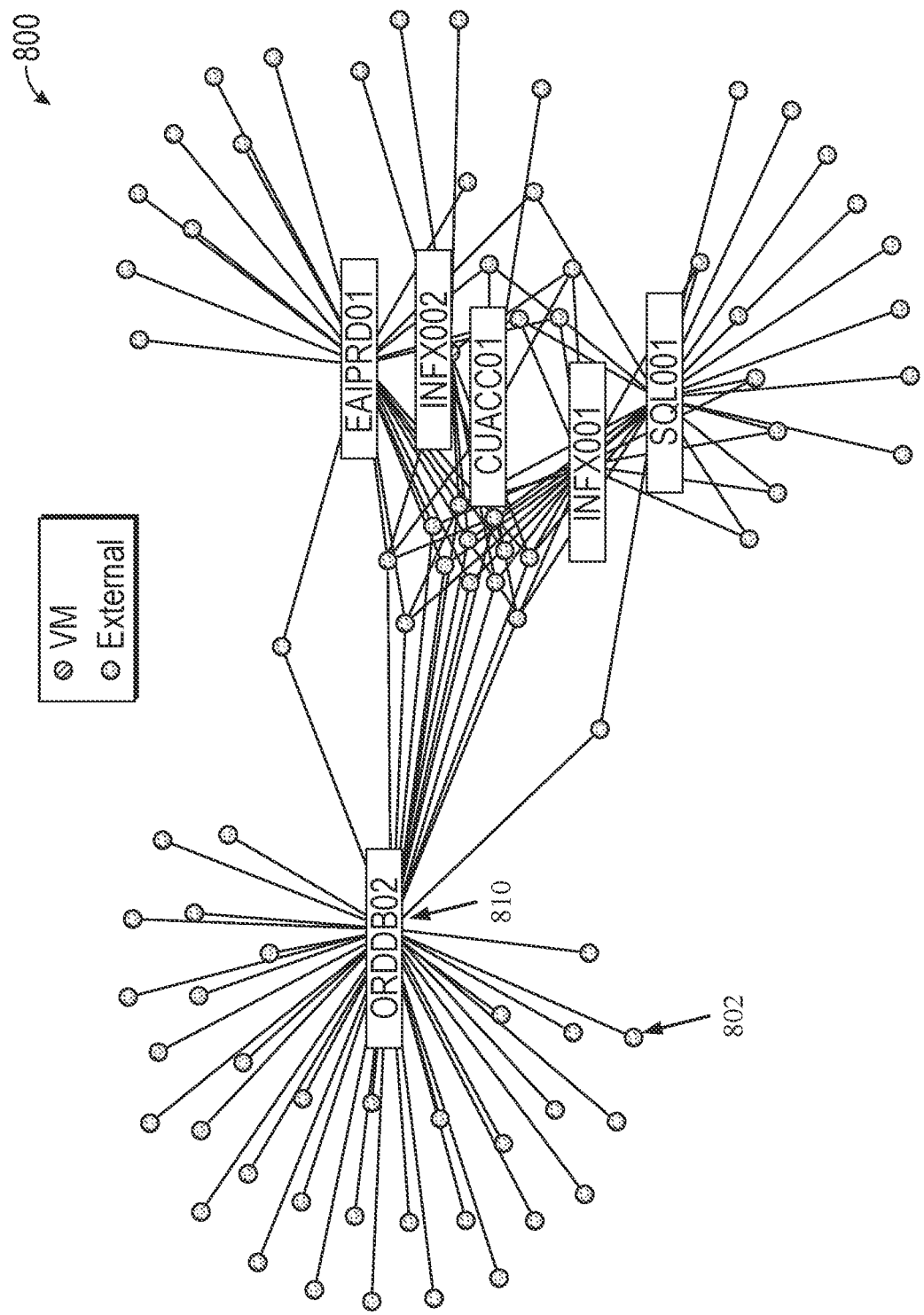
FIG. 8 depicts an example output of virtual machine and external entity traffic according to some embodiments.

The reporting module 224 may receive a request to provide an example output the network traffic between a particular virtual machine and external entities such as the example output 800 of FIG. 8. During the discovery phase of the cloud migration readiness process, the reporting module 224 may provide the example output 800, which depicts a virtual machine 810, given an identifier "ORDDB02." The example output 800 also depicts identifiers of other virtual machines that are in communication with the "ORDDB02" virtual machine. Element 802 of FIG. 8 depicts an entity external to the enterprise network, or an external entity that is in communication with the "ORDDB02" virtual machine. The reporting module 224 may receive a request to provide example outputs from various phases of the cloud migration readiness process such as the example workload utilization table 1500 of FIG. 15.

The flow source datastore 222 may be any structure and/or structures suitable for storing data entries or records (e.g., an active database, a relational database, a self-referential database, a table, a matrix, an array, a flat file, a documented-oriented storage system, a non-relational NoSQL system, an FTS-management system such as Lucene/Solar, and the like). The flow source datastore 222 may receive a request from the communication module 202 to create or update a flow source entry. The flow source entry may include attributes and/or metrics of the discovered flow source. Attributes and/or metrics of the discovered flow sources may be organized to obtain statistics or metrics such as top conversations as seen by each software platform, top IP address by total bit rate, and top IP address by receive or transmit bit rate.

A module may be hardware or software. In some embodiments, the module may configure one or more processors to perform functions associated with the module. Although different modules are discussed herein, it will be appreciated that the content delivery system 106 may include any number of modules performing any or all functionality discussed herein.

Figure 3:
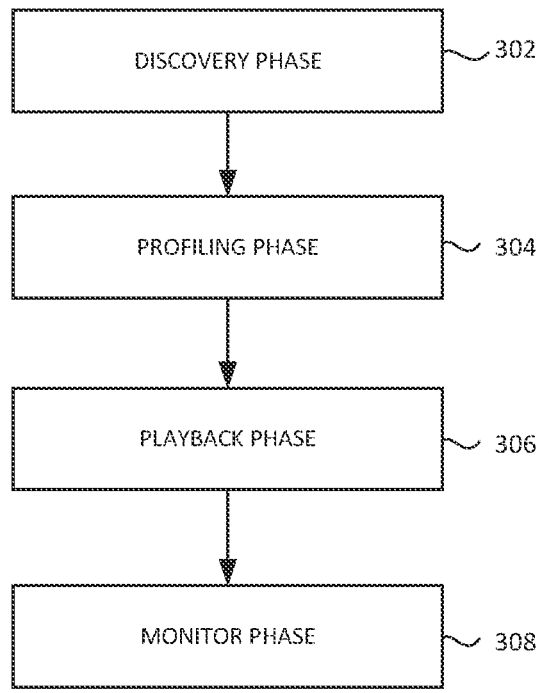
FIG. 3 depicts a flowchart of a cloud migration process of an enterprise system according to some embodiments.

FIG. 3 depicts a flowchart of a cloud migration readiness process 300 of an enterprise system according to some embodiments. The cloud migration readiness process 300 includes a discovery phase 302, a profiling phase 304, a playback phase 306, and a monitor phase 308.

Figure 12A:
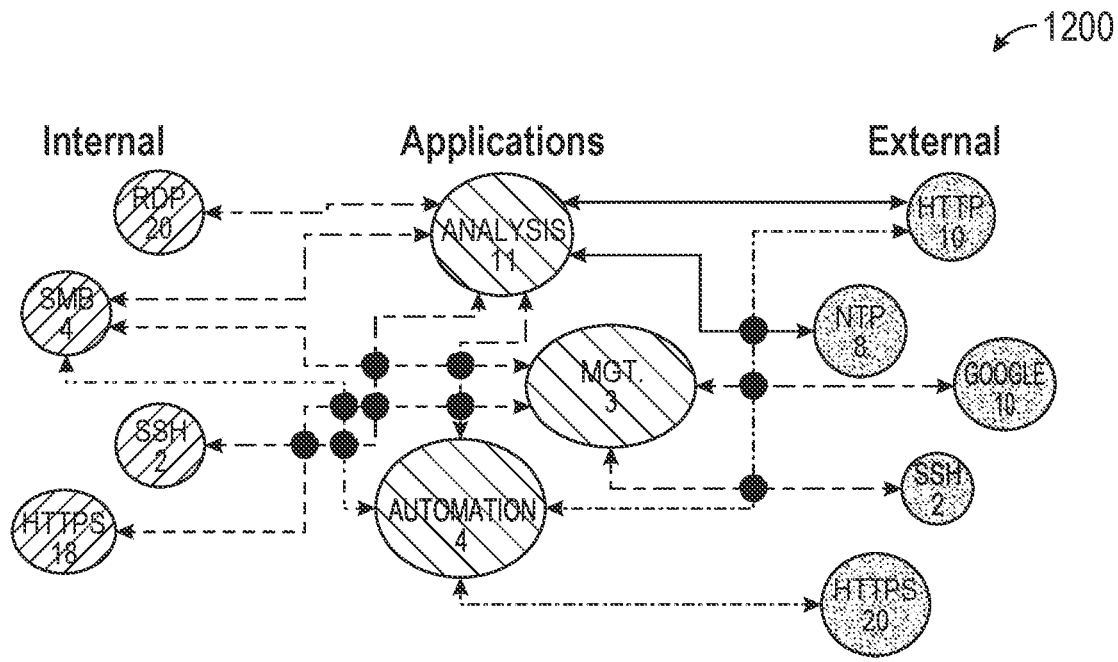
FIG. 12A depicts an example of an on-premises application external and internal dependencies before migration according to some embodiments.

During the discovery phase 302, the CMR service system 185 may identify applications and data flow on the enterprise network to determine an initial internal and external communication map. In some embodiments, the customer may provide business objectives, known applications of the enterprise network, a targeted workload which may include mission-critical applications or virtual machines that have been causing problems, critical peak business time period, and desired completion dates. The CMR service system 185 may use some or all of this information during the discovery phase 302 and other phases of the cloud migration readiness process to generate a report identifying workloads and the cost of migrating the identified workload to different CSPs. Some example output of the discovery phase 302 may be targeted workload inventory, target workload dependency matrices, and a baseline assessment of the health, utilization, and performance aspects of the workloads' on-premises infrastructure. In some embodiments, the discovery phase 302 may have a duration between 2 to 4 weeks. The customer may receive some or all of the output of the discovery phase 302 to determine workloads to profile in the profiling phase 304 of the cloud migration readiness process. The determination of the workloads may be done based on the customer's goals. For example, based on the characterization of the applications of the enterprise network, the customer may decide to migrate a database application to a cloud-based infrastructure—diagram 1200 of FIG. 12A depicts an example of multiple application's external and internal dependencies before migration. As seen in diagram 1200, the internal and external dependencies of three categories of applications of the enterprise network 105 can be seen. For example, the analysis application is dependent on an internal SMB application and an external HTTP application.

During the profiling phase 304, the CMR service system 185 may receive from the customer, workloads to profile, and categorize the workloads into affinity groups. The number of workloads profiled in this phase of the cloud migration readiness process may range from hundreds to thousands. Workloads may be categorized into affinity groups based on utilization levels and temporal characteristics. The workload profiling includes CPU, memory, IO, and network utilization for all on-premises workloads that have been targeted for migration to the cloud. It will be appreciated that in some embodiments, the affinity groups may each be a representative synthetic workgroup. Alternately, in some embodiments, once affinity groups have been created, the CMR service system 185 creates representative synthetic workloads for each affinity group.

In various embodiments, the representative synthetic workload may be a sum of the multiple workloads. Based on the representative synthetic workloads, the CMR service system 185 may select initial cloud configuration choices and presented to the customer. Some example output of the profiling phase may include targeted workload profile, workload affinity group definitions, synthetic workloads, candidate cloud configuration, and candidate cloud configuration costs. In some embodiments, the profiling phase 304 may have a duration of 2 weeks. The customer may receive some or all of the output of the profiling phase to determine workloads for the playback phase.

During the playback phase 306, the CMR service system 185 may target workloads to target for the playback phase and plays back the workloads into a profile of different CSPs. In some embodiments, the CMR service system 185 may select one or more synthetic representative workloads as target workloads. In various embodiments, a user may select the one or more synthetic representative workloads as target workloads. It will be appreciated that, in some embodiments, all of the synthetic representative workloads are target workloads.

Figure 12B:
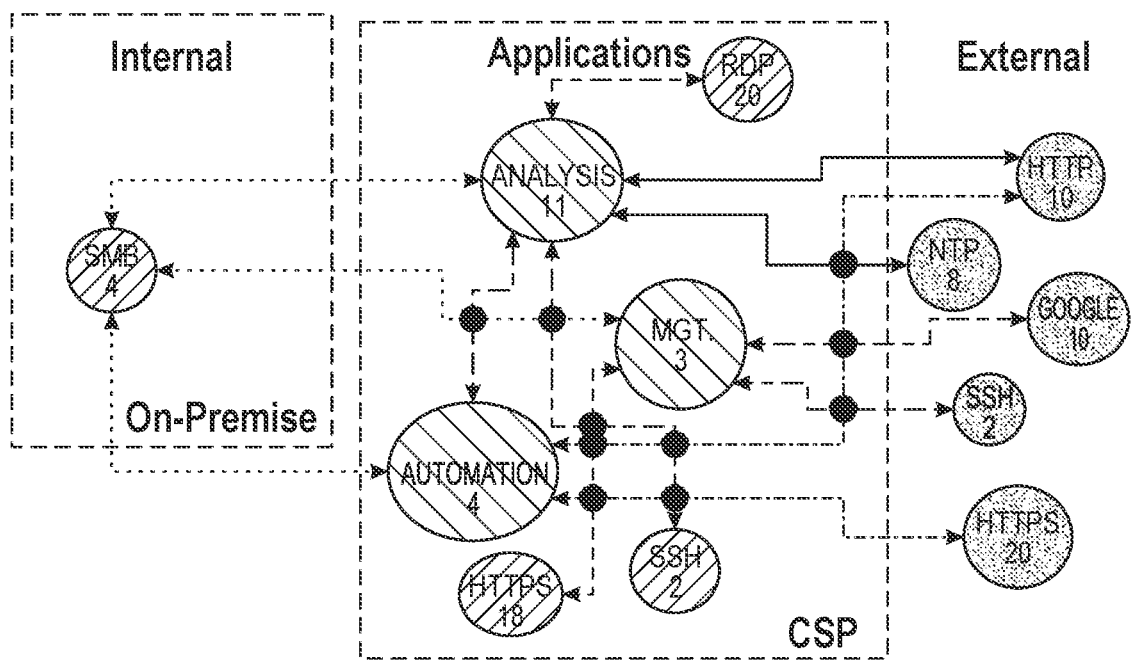
FIG. 12B depicts an example of an application's external and internal dependencies after migration according to some embodiments.

The output of the playback may be a simulated performance of the workload(s) on a particular CSP (or a variety of CSPs). The on-premises performance level is compared to the simulated performance, and costs estimates are re-calculated. Some example output of the playback phase 306 includes a synthetic workload cloud performance report, an updated candidate cloud configuration, and an updated candidate cloud configuration costs. The output of the playback phase 306 may be one or more recommendations of which workloads of the enterprise network to migrate to a CSP, and which CSP may be best suited for the customer's needs. In some embodiments, the playback phase 306 may have a duration of 2 weeks. The customer may receive some or all of the output of the playback phase to determine workloads or applications to migrate to a CSP and a particular CSP to use. Diagram 1250 of FIG. 12B depicts an example of multiple application's external and internal dependencies after migration. As seen in diagram 1250, the CMR service system 185 may provide a recommendation to all internal applications except the SMB application to a cloud-based infrastructure.

The optional monitor phase 308 takes place after the customer migrates the workload or application to a CSP. During the monitor phase 308, the CMR service system 185 verifies that the applications' performance remains within acceptable levels. Some example output of the monitor phase may include cloud workload performance report and cloud configuration report and post-migration recommendations. In one example, the monitor phase 308 may have a duration of 4 weeks. The customer may receive some or all of the output of the monitor phase, determine if fewer or more resources from the cloud infrastructure are required. Further details of each of the phases of the cloud migration readiness process 300 are discussed in FIGS. 4, 13, 18, and 21.

Figure 4:
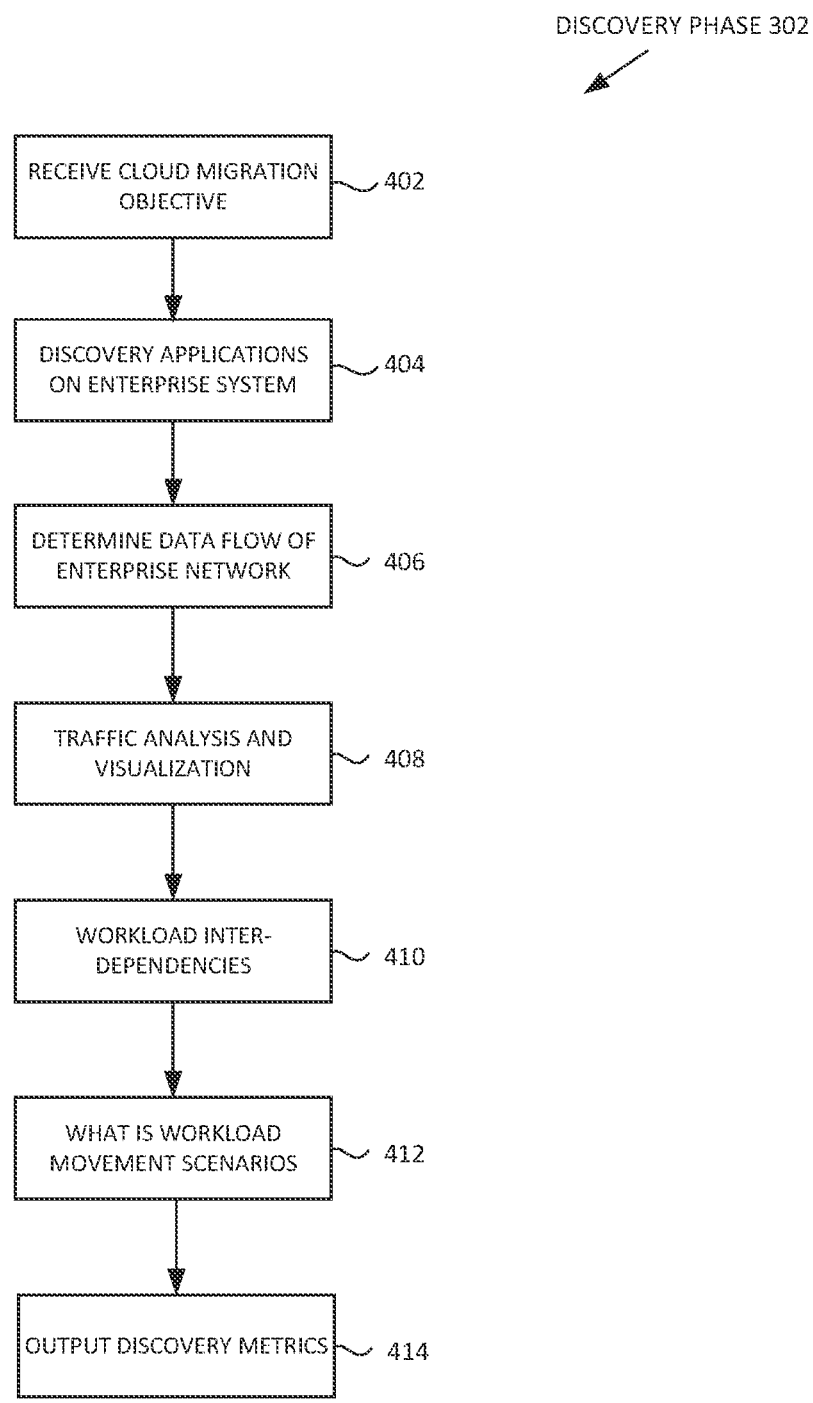
FIG. 4 depicts in further detail the discovery phase of the cloud migration process according to some embodiments.

FIG. 4 depicts in further detail the discovery phase 302 of the cloud migration process according to some embodiments. In step 402, the input module 206 may receive one or more cloud migration objectives. Cloud migration objectives may include a request that the playback phase is completed before a particular date so that the enterprise may make a decision regarding the cloud migration of one or more applications of the enterprise network. In some embodiments, cloud migration objectives may include one or more choices of CSP or a required level of security for some or all of the applications or workloads that need to be migrated to a cloud infrastructure, a required level of performance for some or all applications or workloads that need to be migrated to the cloud infrastructure, and/or the like.

In various embodiments, the migration module 204 may create an inventory of workloads of the enterprise network 105. The migration module 204 may send a request to the reporting module 224 to provide an inventory table or inventory chart, documenting the workloads of the enterprise network's on-premises infrastructure. The inventory table may include the workloads' on-premises configuration, such as the number of virtual central processing units (vCPUs), memory size, and configured storage. The information collected may serve as a reference to understand the on-premise resource demands and requirements of the targeted workloads. One or more phases of the cloud migration readiness process may require at least some of the cloud migration objectives obtained step 402.

In step 404, the CMR service system 185 may send a request to the application discovery system 180 to discovery applications of the enterprise network 105. The application discovery system 180 may receive from the flow source discovery system 170 possible roles of network endpoints. These possible network endpoint roles may be used by the application discovery system 180 to discover applications through heuristic analysis. The output of the application discovery system 180 may be a list of applications on the enterprise network, and entities of the enterprise system associated with each of the applications. The application discovery system 180 may send the list of applications to the application discovery interface module 208. The migration module 204 may send a request to the workload datastore 220 to create a workload entry for one or more applications in the list of applications received from the application discovery system 180. Further details of the application discovery process are discussed in FIG. 5.

In step 406, the CMR service system 185 may send a request to the flow source discovery system 170 to determine one or more flows of data in the enterprise network. A flow in an enterprise network may represent a communication between a source internet protocol (IP) address and a destination IP address. The output of the flow source discovery system 170 may include a list of flow source entries. The list of flow source entries may include attributes associated with discovered flow sources. Attributes may include the type of flow source, total byte count, incoming/outgoing byte count, incoming/outgoing bit rate, total packet rate, and/or incoming/outgoing endpoint count. In some embodiments, attributes associated with flow source entries may include applications associated with the flow source. The flow source discovery system 170 may send the list of flow source entries to the flow source discovery interface module 214. The migration module 204 may store the list of flow source entries to the flow source datastore 226. Further details of the flow source discovery process are discussed in FIG. 6.

Using data from the application discovery system 180, and the flow source discovery system 170, the CMR service system 185 may be able to create an on-premise inventory of workloads of the enterprise network 105. Workloads of the enterprise network 105 may be entities or applications of the enterprise network 105. In some embodiments, the reporting module 224 may provide to the customer an inventory table or inventory chart, documenting the workloads of the enterprise network's on-premises infrastructure. The inventory table may include the workloads' on-premises configuration, such as the number of virtual central processing units (vCPU), memory size, and configured storage. The information collected may serve as a reference to understand the on-premise resource demands and requirements of the targeted workloads.

Figures 7A, 7B:
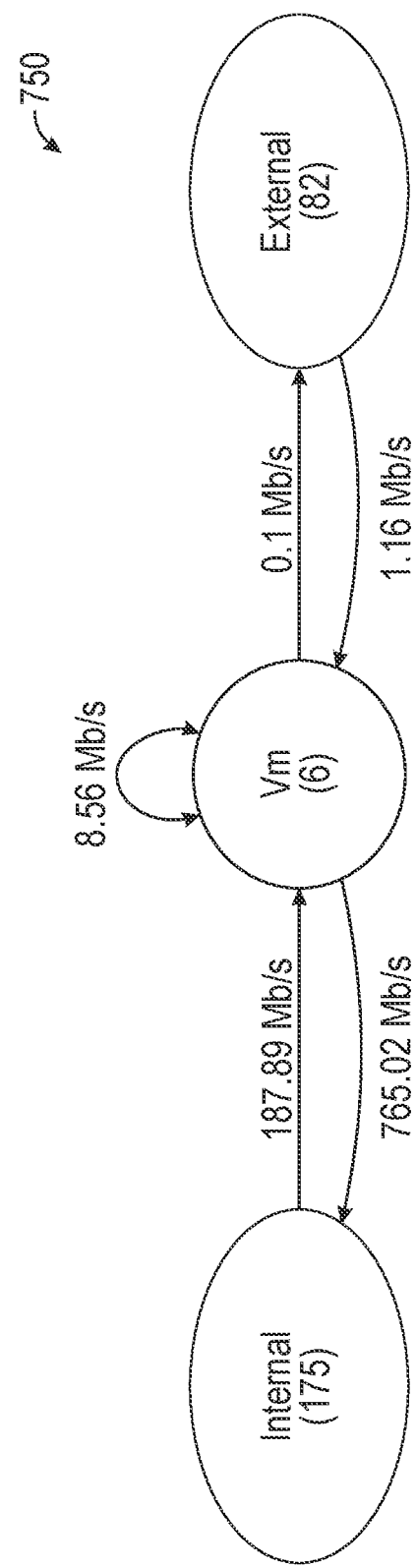
FIG. 7A is a chart depicting traffic dependency of internal and external network traffic according to some embodiments.
FIG. 7B is a diagram depicting the traffic dependency of internal and external network traffic according to some embodiments.

In step 408, the traffic analyzing module 216 analyzes network traffic received from the flow source discovery system 170. The traffic analyzing module 216 may receive network traffic data from a "peak business" period. The peak business period may be a period of at least one week. The data received from the flow source discovery system may be stored in the flow source datastore 226. The traffic analyzing module 216 may determine the amount of data traffic that originates or terminates at a particular virtual machine or another entity of the enterprise network 105 and output this information to the customer in the form of a table or a graphic. An example of this output may be seen in FIGS. 7A and 7B. Example chart 700 of FIG. 7A depicts the amount and type of traffic that goes through a particular virtual machine. Row 710 depicts the amount of traffic between the particular virtual machine to external entities of the enterprise network 105—example diagram 750 of FIG. 7B depicts the same information as the example chart 700 of FIG. 7A. Virtual machine 760 represents the particular virtual machine, while element 770 represents all entities external to the enterprise network 105 which is in communication with the virtual machine 760. Arrows 780 and 785 depicts the directional of the data traffic and the amount of data traffic.

In step 410, the workload module 210 may identify any number of workloads of the enterprise network 105 and the interdependencies of those workloads. In some embodiments, the interdependencies may be utilized to assist in identifying workloads.

Figure 9:
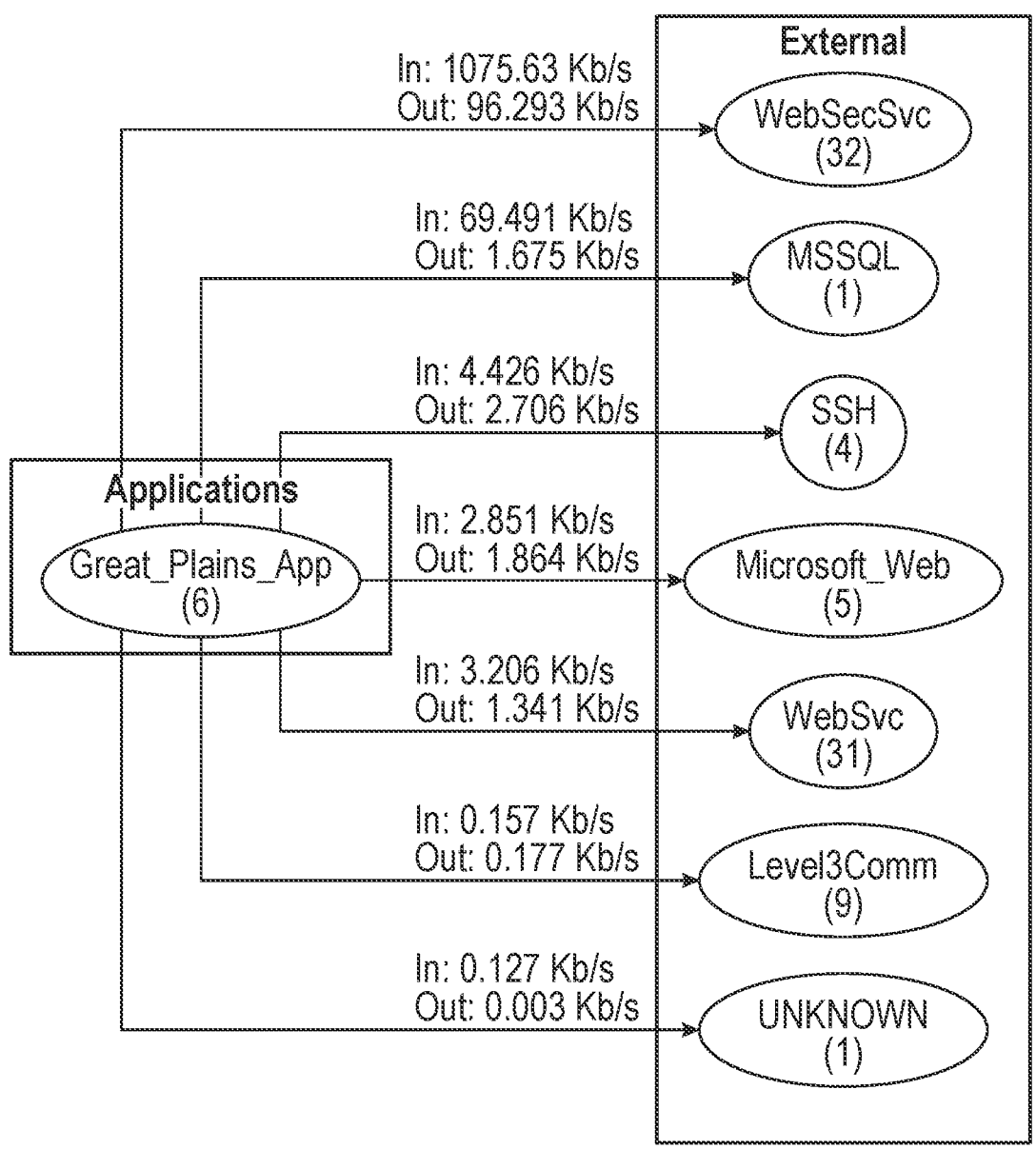
FIG. 9 is a diagram depicting an example application, external sources, and the amount of network traffic between the two according to some embodiments.

In some embodiments, the traffic analyzing module 216 may receive a request from the workload module 210 for network traffic between two or more workloads of the enterprise network 105. The workload module may determine the amount of data traffic that originates from a particular application of the enterprise network 105. Example application network traffic diagram 900 of FIG. 9, which depicts an example application, "Great_Plains_App," and the external entities which this application communications with. Furthermore, the example application network traffic diagram 900 depicts an average amount of network traffic that originates or terminates at the "Great_Plains_App" application.

When the workload module 210 identifies a workload, the workload module may send a request to the workload datastore 220 to create a workload entry. Each workload entry may include metrics or attributes associated with the workload. The attributes of the workload may depend on what the workload represents. For example, if the workload represents a virtual machine, the attributes of the workload may include attributes of the virtual machine such as maximum read speed, maximum write speed, central processing unit (CPU) MHz, memory utilization percentage, storage demand, and IOPS.

Figure 10A:
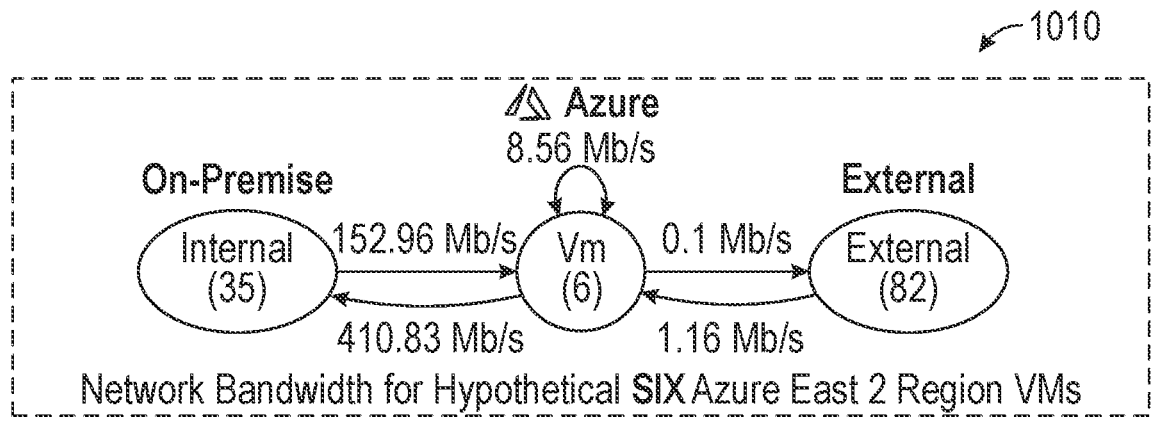
FIG. 10A depicts three examples of "what if" workload movements scenario according to some embodiments.
Figure 10A:
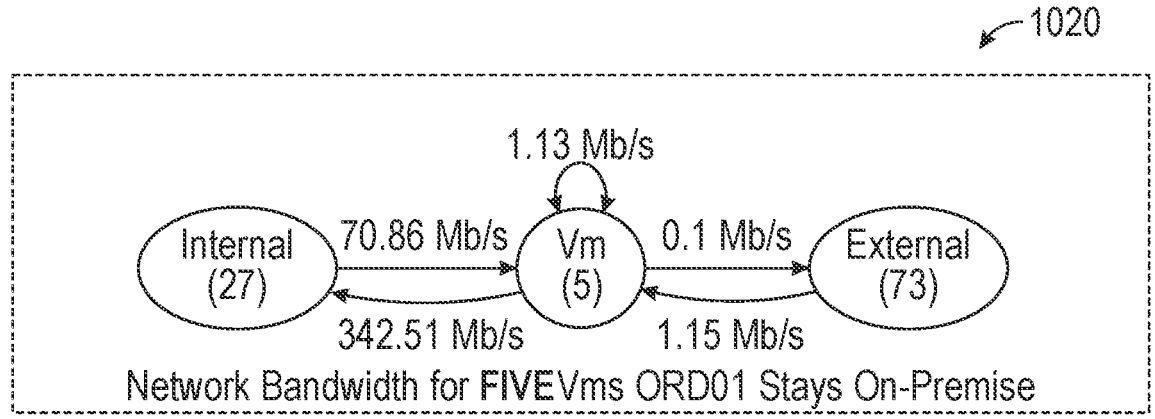
Figure 10A:
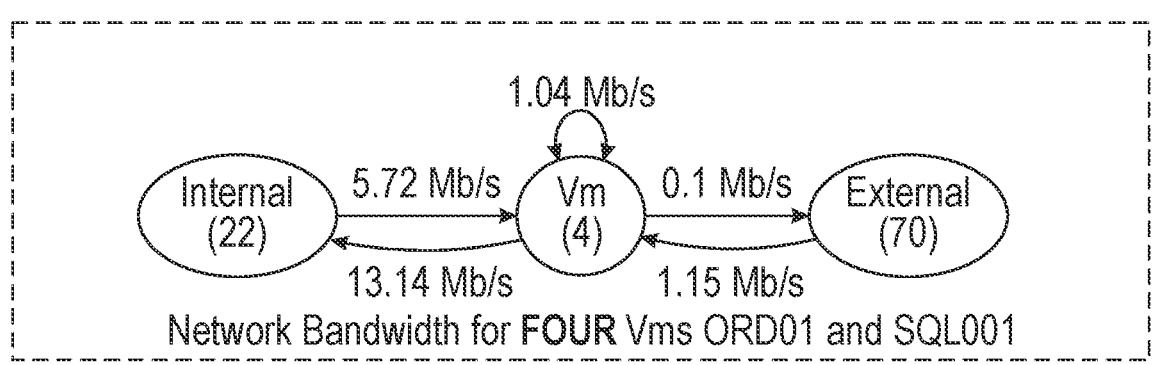

In optional step 412, the workload module 210 may generate "what if" workload movement scenarios, which exposes possible scenarios to aid in deciding to migration one or more workloads based on their bandwidth consumption, dependency on other workloads, and the potential cost associated with which scenario or cloud-on premises network configurations—for example, FIG. 10A depicts three examples of "what if" workload movement scenarios.

Figure 10B:
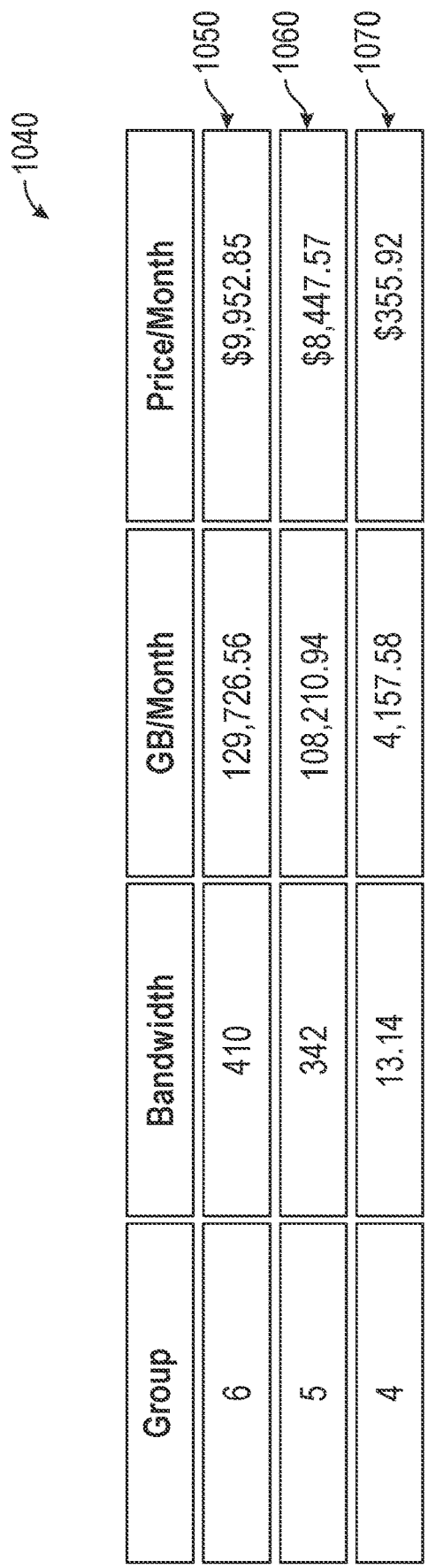
FIG. 10B is a chart depicting the bandwidth and cost associated with each of the "what if" workload movement scenarios of FIG. 10A.

In "what if" scenario 1000, six workloads were chosen to be hypothetically moved to a cloud-based infrastructure such as Microsoft Azure. The workload module 210 may determine the bandwidth requirement for these six virtual machines. The workload module 210 may determine the sum of the amount of network traffic between the six virtual machines, the amount of incoming and outgoing network traffic between any one of the six virtual machines and other virtual machines or entities of the enterprise network 105, and the amount of incoming and outgoing network traffic between any one of the six virtual machines and other entities outside the enterprise network. The sum of these may determine the bandwidth requirement of the six virtual machines. The workload module 210 may send a request to the cloud service provider profile datastore 222 for the Azure CSP profile entry. The workload module 210 may determine the memory storage requirement, the required type of security, and cost per gigabyte to estimate the cost of storing the six workloads into Azure. The reporting module 224 may receive a request from the workload module 210 to provide an estimated cost per month of storing the "what if" scenario 1000 in Azure. Row 1050 of chart 1040 of FIG. 10B provides the estimated cost per month of storing the "what if" scenario 1000 in Azure, along with the bandwidth requirement of the six virtual machines.

In "what if" scenario 1020, five workloads were chosen to be hypothetically moved to Microsoft Azure. The workload module 210 may determine the bandwidth requirement for these five virtual machines. The workload module 210 may determine the sum of the amount of network traffic between the five virtual machines, the amount of incoming and outgoing network traffic between any one of the five virtual machines and other virtual machines or entities of the enterprise network 105, and the amount of incoming and outgoing network traffic between any one of the five virtual machines and other entities outside the enterprise network. The sum of these may determine the bandwidth requirement of the five virtual machines. The workload module 210 may send a request to the cloud service provider profile datastore 222 for the Azure CSP profile entry. The reporting module 224 may receive a request from the workload module 210 to provide an estimated cost per month of storing the "what if" scenario 1020 in Azure. Row 1060 of chart 1040 of FIG. 10 provides the estimated cost per month of storing the "what if" scenario 1010 in Azure, along with the bandwidth requirement of the five virtual machines.

In "what if" scenario 1030, four workloads were chosen to be hypothetically moved to Microsoft Azure. The workload module 210 may determine the bandwidth requirement for these four virtual machines. The workload module 210 may determine the sum of the amount of network traffic between the four virtual machines, the amount of incoming and outgoing network traffic between any one of the four virtual machines and other virtual machines or entities of the enterprise network 105, and the amount of incoming and outgoing network traffic between any one of the four virtual machines and other entities outside the enterprise network. The sum of these may determine the bandwidth requirement of the four virtual machines. The workload module 210 may send a request to the cloud service provider profile datastore 222 for the Azure CSP profile entry. The reporting module 224 may receive a request from the workload module 210 to provide an estimated cost per month of storing the "what if" scenario 1030 in Azure. Row 1070 of chart 1040 of FIG. 10 provides the estimated cost per month of storing the "what if" scenario 1020 in Azure, along with the bandwidth requirement of the four virtual machines.

In step 414, the reporting module 224 may receive a request from the workload module 210 to provide one or more of the targeted workload inventory, target workload dependency matrices, and a baseline assessment of the health, utilization, and performance aspects of the workloads' on-premises infrastructure. Examples of the output of the discovery phase 302 can be seen in FIG. 7A through 11C. Based on the "what if" scenarios and other output of the discovery phase 302, the IT administrator of the enterprise network may 105 identify and fine-tune applications or workloads to target for cloud migration.

Figure 5:
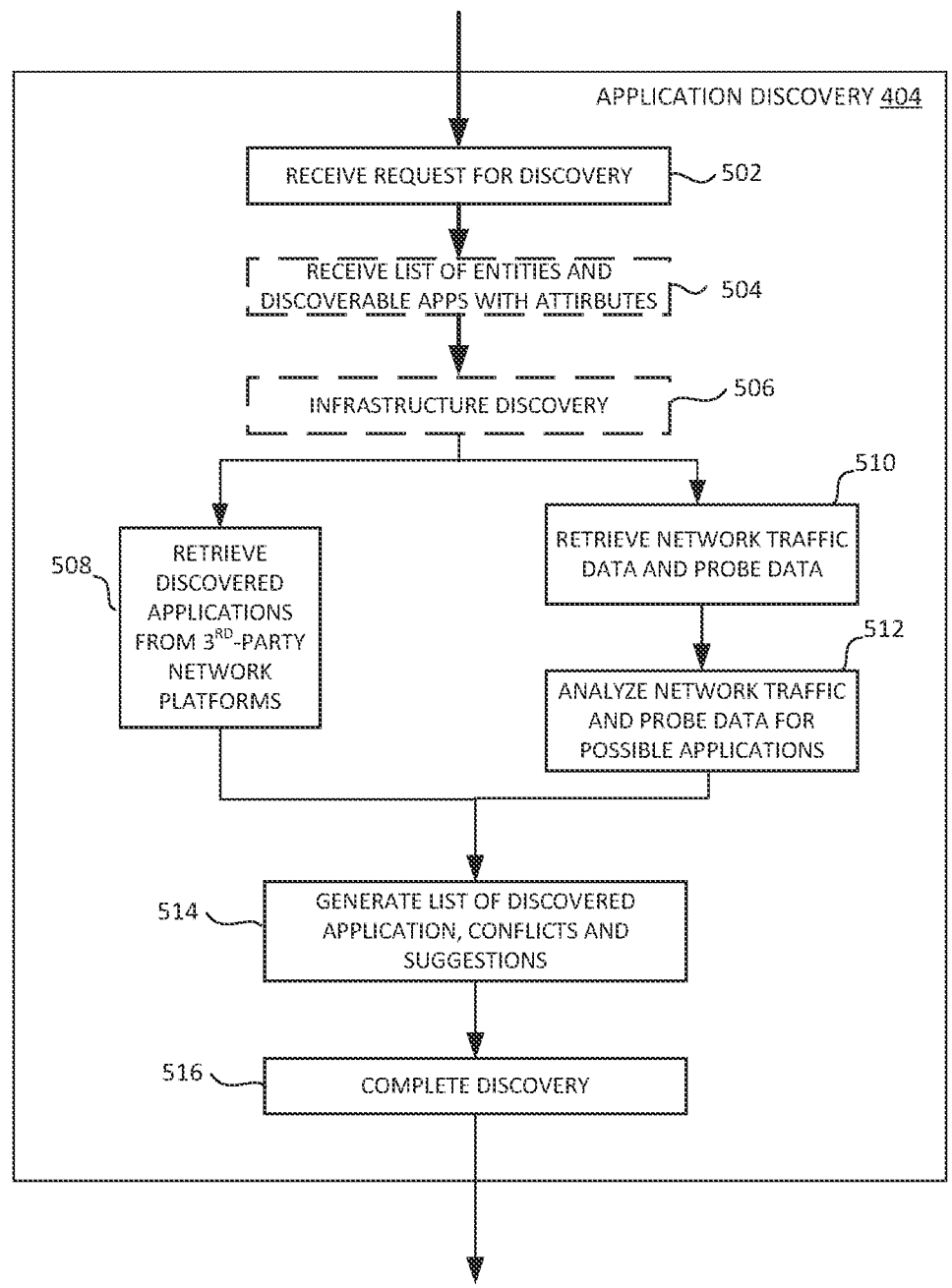
FIG. 5 depicts in further detail of an application discovery step of the discovery phase according to some embodiments.

FIG. 5 depicts in further detail of an application discovery step of the discovery phase according to some embodiments. In step 502, the application discovery system 180 may function to determine if one a plurality of trigger conditions is satisfied. The application discovery system 180 may receive a notification or indication that one of the plurality of trigger conditions has been satisfied. The trigger conditions may include a request to commence the application discovery process, a current time equaling a start time of a scheduled application discovery process, a signal, or resource utilization of one or more entities if less than an entity utilization threshold.

In optional step 504, the application discovery system 180 may receive from the IT administrator a list of applications running on the enterprise network 105 and entities of the enterprise network 105 associated with each of the plurality of applications. In some embodiments, the application discovery system 180 is configured to receive attributes of any number of the applications running on the enterprise network 105 and attributes of each of the entities associated with each of the plurality of applications.

In various embodiments, the application discovery system 180 may create and store any number of discovered application entries based on information received from the IT administrator.

In optional step 506, the application discovery system 180 determines the infrastructure of the enterprise network 105. In some embodiments, the application discovery system 180 discovers attributes of any number of entities of the enterprise network 105 and creates and stores entity entry. Building an infrastructure of the enterprise network 105 may aid users of the application discovery system 180 with a visual representation of the infrastructure in the context of key applications of the enterprise.

In step 508, the application discovery system 180 may receive data regarding applications, the data received regarding the application may include attributes of the application, such as the name, the number of entities making up the application, the tier mapping of the application. The data received regarding the application may include attributes of each of the entities associated with the application. Attributes of the entities may include entity category, entity type, speed of the channel, and alarms. Some entity attributes may be dependent on the type of entity; for example, fiber channels may have an attribute describing the speed of the channel.

The application discovery system 180 may receive data from the IT management software platform subscribed to by the enterprise network 105, such as ServiceNow. In various embodiments, the application discovery system 180 may receive data regarding discovered applications from other IT management software platforms. In various embodiments, the application discovery system 180 may create or update entity entries with data received from ServiceNow or other IT management software platforms.

In some embodiments, if the application discovery system 180 discovers that a particular application has not changed in the last number of iterations of the application discovery process. In such a case, the application discovery system 180 may choose to limit the application discovery process to avoid re-identification and/or re-discovery of a subset of applications periodically. In various embodiments, the number of iterations which triggers the periodic discovery of an application may change according to attributes of the particular application, such as tier or criticality of the particular application.

The application discovery system 180 may receive data from application performance software platforms subscribed to by the enterprise network 105, such as AppDynamics. The application discovery system 180 may create or update entity entries with data received from AppDynamics or other application performance software platforms.

In some embodiments, if the application discovery system 180 discovers that a particular application has not changed in the last number of iterations of the application discovery process. In such a case, the application discovery system 180 may choose to identify or discover the application periodically. In various embodiments, the number of iterations which triggers the periodic discovery of an application may change according to attributes of the particular application, such as tier or criticality of the particular application.

In step 510, the application discovery system 180 may receive a request from the flow source discovery system 170 to accept flow records between two IP addresses. The application discovery system 180 may receive flow records from switches that enable a network protocol that provides the ability to collect IP network traffic using software such as NetFlow. These flow records may be analyzed by the application discovery system 180 to determine possible network endpoints and possible applications on the enterprise network 105.

In some embodiments, the application discovery system 180 retrieves flow records from NetFlow during scheduled retrieval periods. In various embodiments, the application discovery system 180 retrieves flow records when the application discovery system 180 determines that the utilization of switches enabled with the NetFlow software is below the entity utilization threshold.

In some embodiments, the application discovery system 180 receives flow data to and from storage devices 110. Probe data may include IP address, probe type, network address, speed of the channel and status of the probe, number of CPUs, operating system (OS) version, and applications running on the host.

In step 512, the application discovery system 180 may receive the network traffic data from the network traffic analyzer software platform 150. In some embodiments, the application discovery system 180 suggests, based on heuristic implications, applications that could exist. The result of the implications may be a possible discovered application. For example, the application discovery system 180 may observe that a particular IP address is the flow source/destination to/from thousands of seemingly random IP addresses and determine that the particular IP address belongs to an edge device.

In another example, through SSH or WMI, the application discovery system 180 may determine that one of the host 120 of the enterprise network 105, which is part of the SAP, is running out-of-date software, however, that particular host 120 may have been replaced with different software. The out-of-date software may not have been removed from one of the host 120. The attributes of the SAP application, as well as attributes associated with the out-of-date software running on one of the host 120, may be sent to the application discovery system 180.

In various embodiments, the application discovery system 180 may perform a heuristic analysis of the attributes of any number of entities of the enterprise network 105. Attributes may include the name of the entity when an entity was introduced to or became a part of the enterprise network 105. Attributes may be used to determine if any number of entities is a part of an application. For example, entities with names containing a prefix or suffix that are the same may be a part of the same application.

In some embodiments, a time when entities of the enterprise network are introduced into the enterprise network may be analyzed and compared with an entity's introduction threshold that may be used to determine potential applications. For example, entities introduced to the enterprise network 105 within the entity's introduction threshold of 5 minutes may be part of the same application; in either case, the application discovery system 180 may create a discovered application entry for each of the potential applications. The entities' introduction threshold may be set by the IT administrator or may be set by the application discovery system 180. In various embodiments, the application discovery system 180 may suggest that two particular entities of the network may comprise an application if the two particular entities are in constant contact throughout the day, with amount of IP traffic passing back and forth between the two particular entities is more than any other pair of entities of the network.

In step 514, the application discovery system 180 outputs a list of discovered application entries and/or a plurality of entity entries. The application discovery system 180 may output any number of the discovered application entries in the form of a chart, with each discovered application entry as well as application attributes displayed in text form. In some embodiments, entities associated with each discovered application, as well as attributes associated with each entity, may be displayed in text form.

Attributes of the discovered application entry output by the application discovery system 180 may include the software platform responsible for the application associated with the discovered application entry. Other attributes include tier mapping of applications discovered by different networks, names of the application. Attributes of the entities may include entity category, entity type, speed of the channel, and/or alarms. Some entity attributes may be dependent on the type of entity; for example, fiber channels may have an attribute describing the speed of the channel.

In some embodiments, an application conflict may be provided by the application discovery system 180 to the IT administrator to be resolved. Consider an example, if AppDynamics identifies a first SAP application with eight entities, including three cloud-based storage devices and four locally-based storage devices. The application discovery system 180 implies a second SAP application with the same eight entities, including the three cloud-based storage devices and the four locally-based storage devices, as the first SAP application plus an additional cloud-based storage device which is not shown in the first SAP application. The discovered application entry may be created for each of the SAP application and the application conflict may be outputted by the application discovery system 180. The application conflict may be resolved by the IT administrator.

In various embodiments, the application discovery system 180 may resolve the conflict without assistance from the IT administrator. In various embodiments, the application discovery system 180 may resolve the conflict by using the tier mapping of software platforms. For example, the IT administrator may choose to prioritize applications discovered by ServiceNow over applications discovered by AppDynamics, such that if there is an application conflict between applications discovered by ServiceNow and AppDynamics, the conflict will be automatically resolved by the application discovery system 180 by choosing the application discovered by ServiceNow as the correct one.

Once entities of the enterprise network 105 have been identified, data from the network software platforms and network probes may have been received and analyzed by the application discovery system 180, and the application discovery process may proceed to step 516. In step 516, an iteration of the application discovery process is complete.

The output of the application discovery system 180 may output to the CMR service system 185 a list of application entries on the enterprise network 105, and entities of the enterprise system associated with each of the applications.

In some embodiments, the iteration application discovery process may be deemed as complete after the application discovery system 180 receives data from software platforms and network probes for a predetermined period of time. In some embodiments, the predetermined period of time is seven days. In various embodiments, the predetermined period of time is 24 hours. In one embodiment, the predetermined period of time is set by the IT administrator. In some embodiments, the iteration application discovery process may be deemed as complete if the application discovery system 180 determines that a duplicated application counter is greater than a duplicated application threshold.

Other details and features of the application discovery process may be to suspend the application discovery process and creating a bookmark of the last network data received from the network traffic monitoring platform, a request to suspend the application discovery process may be triggered when a suspension trigger condition is satisfied, for example, which may be combinable with those described here, can be found in U.S. patent application Ser. No. 16/234,353, filed on Dec. 27, 2018; the contents of which is hereby incorporated by reference in its entirety.

Figure 6:
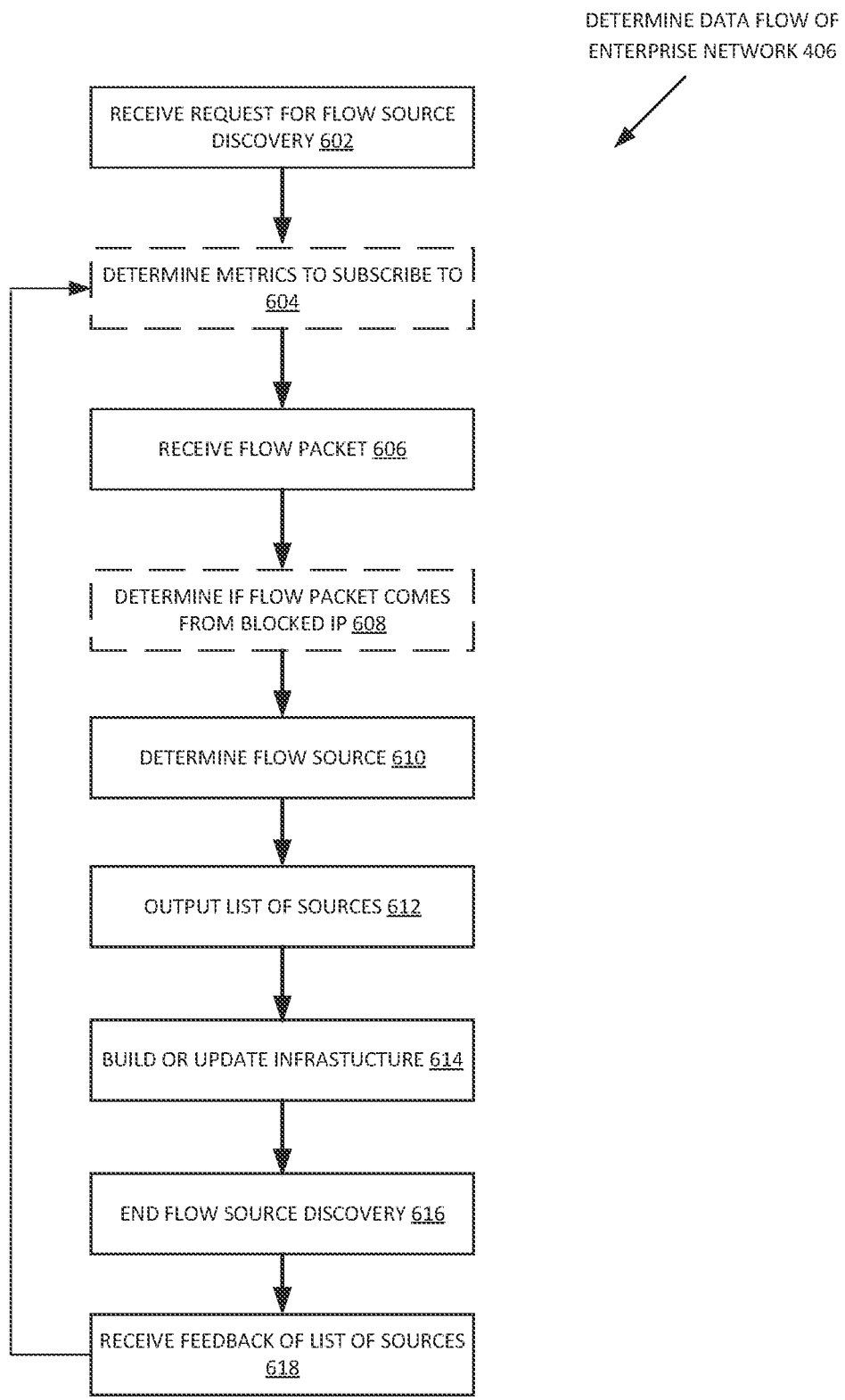
FIG. 6 depicts in further detail of a flow source discovery of the discovery phase according to some embodiments.

FIG. 6 depicts a flowchart of a flow source discovery process of an enterprise network according to some embodiments. In step 602, the flow source discovery system 170 may execute the flow source discovery. In some embodiments, the flow source discovery system 170 may receive a request to start the flow source discovery process when any number of trigger conditions are satisfied. For example, if a current time equals a predetermined start time, a trigger condition may be satisfied.

In optional step 604, the flow source discovery system 170 may determine any number of attributes and/or metrics of discovered flow sources to monitor and provide. The flow source discovery system 170 may provide a set of attributes of discovered flow sources. The set of attributes and/or metrics may include the type of flow source, total byte count, incoming/outgoing byte count, incoming/outgoing bit rate, total packet rate, and/or incoming/outgoing endpoint count. In the subsequent flow source discovery process, the flow source discovery system 170 may monitor and output a subset of attributes of discovered flow sources.

In step 606, the flow source discovery system 170 may receive IP network traffic data from any number of network traffic analyzing software platforms 150 and/or TAP 140. The IP network traffic data may be in data packets. Data packets collected from different routers and switches with different network traffic analyzing software platforms may be in different formats. In some embodiments, the flow source discovery system 170 may store any number of the data packet entries associated with each of the data packets received from the network traffic analyzing software platform 150.

In optional step 608, the flow source discovery system 170 may determine any number of entities of the switch fabric to monitor. In an initial flow source discovery process, the flow source discovery system 170 may analyze flow records associated with all entities of the switch fabric. In response to the output of the initial flow source discovery process, the flow source discovery system 170 may receive from the IT administrator of the enterprise network 105, a list of entities of the switch fabric that the IT administrator would like to continue monitoring. The flow source discovery system 170 may store the list. In subsequent flow source discovery process, the flow source discovery system may ignore or reject flow records from entities of the switch fabric not listed in the first list.

In step 610, the flow source discovery system 170 may analyze any number of received data packets and determine a flow source of flow records. In some embodiments, the flow source discovery system 170 does not begin to analyze any number of data packets until the end of the time frame. In various embodiments, the flow source discovery system 170 analyzes any number of data packets as it is being received by the flow source discovery system 170.

In step 612, the flow source discovery system 170 may provide any number of flow source entries to an interface or report. For example, the flow source discovery system 170 may provide any number of flow source entries in the form of a chart, with each discovered flow source entry as well as attributes associated with discovered flow sources displayed in text form. In some embodiments, entities of the enterprise network 105 found along the data path associated with the discovered flow source entry, as well as attributes associated with each entity, may be displayed in text or in the form of an infrastructure topology view.

In step 614, the flow source discovery system 170 may build or update the infrastructure of the enterprise network 105. In some embodiments, as any number of flow source entries are created or updated, the flow source discovery system 170 may obtain more information regarding the connectivity of entities of the enterprise network 105.

The flow source discovery system 170 may provide other information besides the connectivity of entities in the enterprise network 105. For example, the representation of entities of the enterprise network 105 may include alarms or alerts associated with one or more entities.

In some embodiments, once initiated, the flow source discovery process may continue until it is completed. In step 616, the flow source discovery system 170 may determine that the flow source discovery process is complete after retrieving traffic data from the one or more network traffic analyzing software platform for a fixed interval of time. In various embodiments, the flow source discovery system 170 may determine that the flow source discovery process is complete when the flow source discovery time frame is over.

In step 618, in response to the displaying or report any number of flow source entries, the flow source discovery system 170 may receive information from the IT administrator. The received feedback may include a first list containing any number of entities of the switch fabric that the IT administrator wants to continue monitoring. In some embodiments, the received feedback includes a second list containing any number of attributes of the switch fabric which the IT administrator would like to continue monitoring.

The second list may be used in step 604 to determine any number of attributes or metrics of discovered flow sources to monitor and provide in subsequent flow source discovery processes. The first list may be used in step 608 to determine any number of entities of the switch fabric to monitor and provide in subsequent flow source discovery processes.

Other details and features of the flow source discovery process may be to suspend the flow source discovery process may further comprise identifying a flow packet as belonging to one of at least two flow package types based on a format, for example, which may be combinable with those described here, can be found in U.S. patent application Ser. No. 16/234,402, filed on Dec. 27, 2018; the contents of which is hereby incorporated by reference in its entirety.

Figure 13:
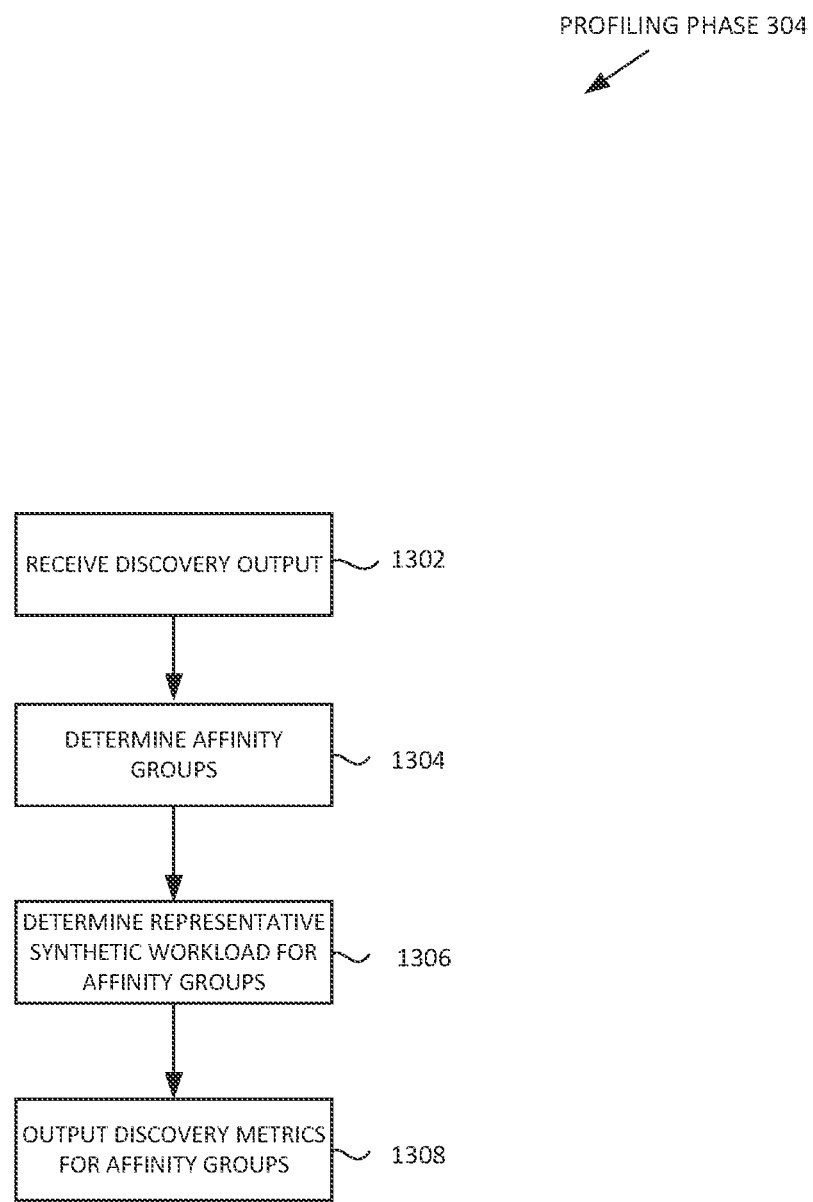
FIG. 13 depicts in further detail of the profiling phase of the cloud migration process according to some embodiments.

FIG. 13 depicts in further detail of the profiling phase 304 of the cloud migration process according to some embodiments. During the profiling phase 304, analytics are applied to the workloads that were characterized during the discovery phase 302. Depending on the organization's goals, the number of workloads under consideration may range from hundreds to thousands. In some embodiments, the first step in the profiling phase 304 may be to utilize the workload characterization data (e.g., attributes) to produce affinity groups.

The workload characterization or attribute data may include, for example, CPU, memory, IO, and network utilization for all or some on-premise workloads that have been targeted for migration to the cloud.

The affinity groups may each include workloads with similar resource utilization levels and temporal (time-based) characteristics. In some embodiments, the affinity group module 206 associate workloads into groups based on their utilization levels. It may be appreciated that the workloads may be associated into groups in many different ways.

In step 1302, the migration module 204 may send a request to the workload datastore 220 for the workloads discovered in the discovery phase 302. The discovery output may include workload characteristics and interdependencies among compute, network, and storage elements of an on-premises enterprise system.

In step 1304, the affinity group module 212 may categorize workloads identified by the workload module 210 into affinity groups. In some embodiments, the affinity group module 206 may receive performance metrics. In some embodiments, performance metrics may include utilization metrics. It will be appreciated that the metrics may be independent of any cloud service provider.

Utilization metrics may be received from any number of different sources. In some embodiments, the utilization metrics and measurements may be reported from applications, virtual machines, hypervisors, operating systems, applications, servers, or third-party performance service providers (e.g., NetFlow or ServiceNow). In some embodiments, the utilization metrics may include any number of the following:
1. CPU Utilization
2. Memory Utilization
3. IO Read Utilization
4. IO Writes Utilization
5. IO Number of Reads
6. IO Number of Writes
7. Network Receive Rate
8. Network Transmit Rate Affinity groups may consist of workloads with similar resource utilization levels and temporal or time-based characteristics. For example, workloads with similar CPU utilization, IO number of reads, and IO number of writes may be grouped into the same affinity group. In some embodiments, a workload may belong to more than one affinity group. In other embodiments, each workload may only belong to one affinity group.

In one method, the CMR service system 185 may utilize a machine learning algorithm to categorize or group workloads into affinity groups. In some embodiments, the workload module may apply a k-means clustering algorithm to the multiple workloads identified by the workload module 210. The k-means clustering algorithm may have a feature seat represented by average, a percentile of maximum values of utilization metrics. In some embodiments, utilization metrics include CPU utilization, memory utilization, input/output (IO) read utilization; IO write utilization, IO number of reads, IO number of writes, network receive rate, and network transmit rate.

In some embodiments, the CMR service system 185 applies a k-means clustering algorithm with a feature set represented by average, percentile of maximum values of the utilization metrics. This method may be independent of the cloud service provider and relies solely on the performance of the workloads.

K-means clustering aims to partition n observations into k clusters in which each observation belongs to the cluster with the nearest mean, serving as a prototype of the cluster. This results in a partitioning of the data space into Voronoi cells. K-means minimizes within-cluster variances such as squared Euclidean distances.

In one example, given a set of utilization metrics measurements $(x_1, x_2, \ldots, x_n)$, where each utilization metrics measurement is a d-dimensional real vector, the affinity group module 212 may utilize k-means clustering to partition the n utilization metrics measurement into $k(\leq n)$ sets $S=\{S_1, S_2, \ldots, S_k\}$ so as to minimize the within-cluster sum of squares (WCSS) (i.e., variance). The objective may be to find:

$$\arg_S \min \Sigma_{i=1}^{k} \Sigma_{x \in S_i} \|x - \mu_i\|^2 = \arg_S \min \Sigma_{i=1}^{k} |S_i| \text{VAR} S_i$$

where $\mu_i$ is the mean of points in $S_i$.

In another method, the affinity group module 212 groups workloads by their maximum or percentile utilization metric fitness into available cloud instances for a specific CSP. This method may be utilized when a particular CSP to use has already been determined. There can be other methods achieving the same goal of grouping workloads in addition to two described above. As a result of such grouping, selection of a cloud instance for a group means selection of the cloud instance for all members of the group and, thus, a process of selecting thousands of instances and verification of the performance is reduced to selection and verification of several dozens of instances.

Once the affinity group module 212 determines the workloads that belong to each affinity group, the affinity group module may determine the representative synthetic workload for each affinity group. The representative synthetic workload may reduce playback time by capturing relevant utilization attributes of the workloads within an affinity group.

In one example, time slices of a predetermined time duration (e.g., between 30 min-60 min long) may be selected containing the maximum performance values for each of the metrics among all virtual machines within the affinity group. A time slice may have statistics on all metrics for a chosen virtual machine containing a maximum value of a specific metric. Next, the all selected time slices may be concatenated to build a synthetic representative workload for an affinity group. It may be constructed by concatenating temporal segments of various workloads to preserve relevant utilization levels for the group. The result is a high-fidelity synthetic representation of the hundreds or thousands of workloads.

It may be appreciated that armed with synthetic representative workloads, the number of workloads that require verification in the cloud is significantly reduced. The complexity and scale are condensed to a manageable set without losing the original and critical characteristics of the on-premise workloads.

The representative synthetic workload for each affinity group may be a sum of the multiple workloads which make up the affinity group. In various embodiments, the representative synthetic workload for each affinity group may be a weighted sum of the multiple workloads which make up the affinity group, with each of the multiple workloads given a weight based on attributes or characteristics of the workload. In some embodiments, the affinity group module may send a request to the workload datastore 220 to store the representative synthetic workload associated with each affinity group.

The affinity group module 212 may generate a table or chart which comprises temporal data capturing utilization level for some or all of the utilization metrics during a temporal data capture period. An example of this may be seen in FIG. 15. Table 1500 of FIG. 15 contains temporal data capturing utilization levels of two example workloads of the enterprise network 105. The columns of the example table 1500 are associated pairs of date/time of data and the name of the workload that is being monitored by the infrastructure performance management appliance 160 for a particular utilization metric. The number of column pairs is equal to the number of workloads being monitored by the workload module 212. For example, column 1510 provides a timestamp for measuring the particular utilization metric, while column 1520 provides the measurement for the particular utilization metric associated with the timestamp in the same row.

Once the affinity groups have been created, step 1306 may proceed. In step 1306, the CMR service system 185 may utilize a machine learning algorithm to create a representative synthetic workload for each affinity group. The representative synthetic workload may reduce the time required to playback or simulate the workload on a CSP profile by capturing relevant utilization attributes of the workloads within an affinity group.

As discussed herein, the affinity group 212 may select a workload time slice which contains the maximum performance values for each of the utilization metric among all virtual machines within the affinity group. In some embodiments, the workload time slice is predetermined by the CMR service system 185. In one embodiment, the workload time slice is between 30 to 60 minutes long. A workload time slice has statistics on all metrics for a chosen virtual machine containing a maximum value of a specific metric. A particular affinity group may have workload time slices of different lengths taken at different time frames of the temporal data capture period. For example, for a particular affinity group, the workload time slice containing a maximum value for memory utilization may be a 30-minute time slice taken on Monday between 9:00 a.m. and 9:30 a.m. For the same affinity group, the workload time slice containing a maximum value for CPU utilization may be a 45-minute time slice taken on Tuesday between 4:30 p.m. and 5:15 p.m. In various embodiments, a particular affinity group may have workload time slices of the same length taken at the same time frame of the temporal data capture period. For example, for the same affinity group, the workload time slice containing a maximum value for all utilization metrics may be a 60-minute time slice taken on Friday between 11:00 a.m. and 12:00 p.m. All selected time slices are concatenated to build a representative synthetic workload for an affinity group. It is constructed by concatenating temporal segments of various workloads to preserve relevant utilization levels for the group. The result is a high-fidelity synthetic representation of the hundreds or thousands of workloads. Armed with representative synthetic workloads, the number of workloads that require verification in the cloud is significantly reduced. The complexity and scale are condensed to a manageable set without losing the original and critical characteristics of the on-premise workloads.

Figure 14:
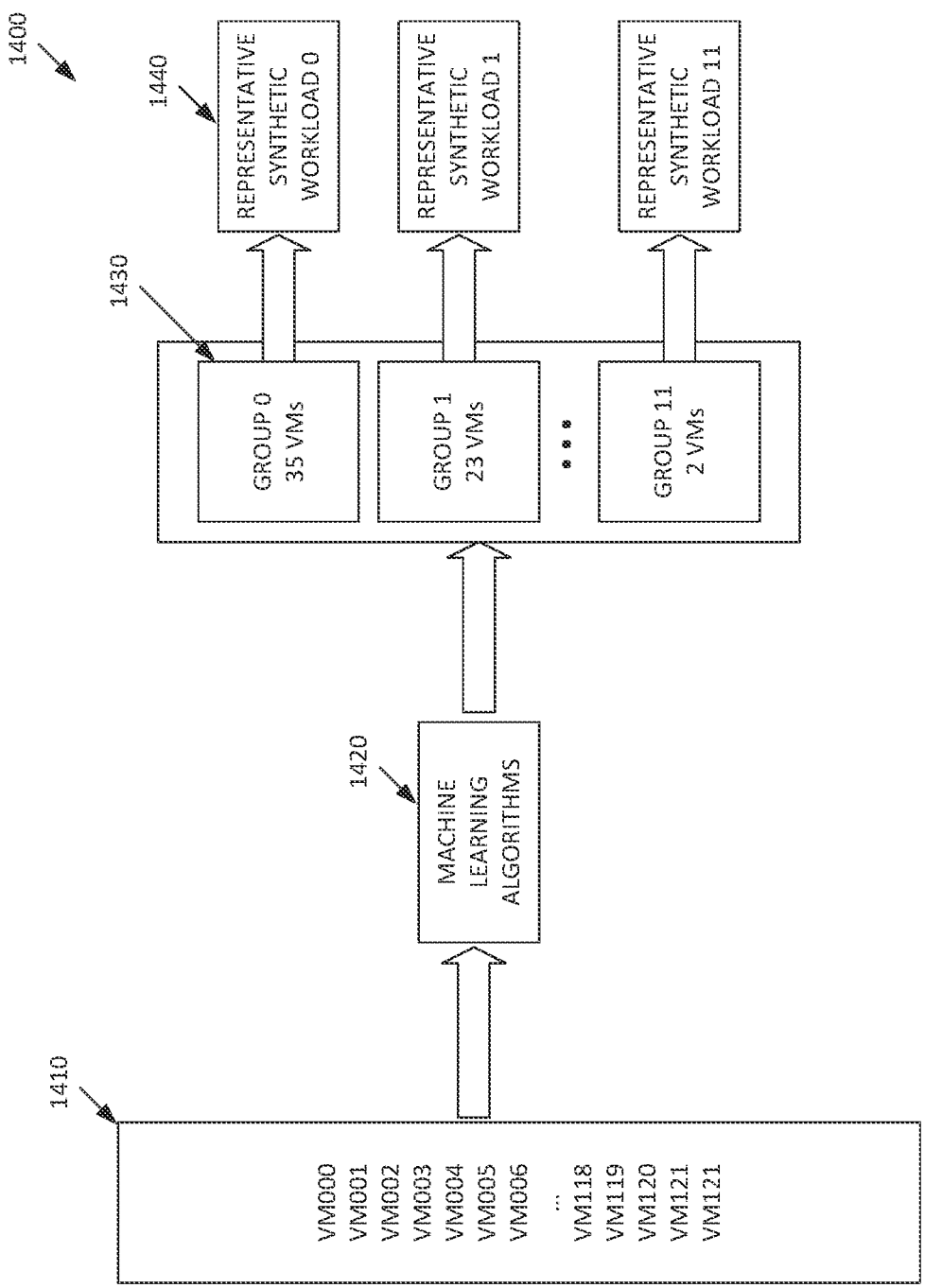
FIG. 14 depicts affinity groups and representative synthetic workloads of the enterprise network according to some embodiments.
Figure 16:
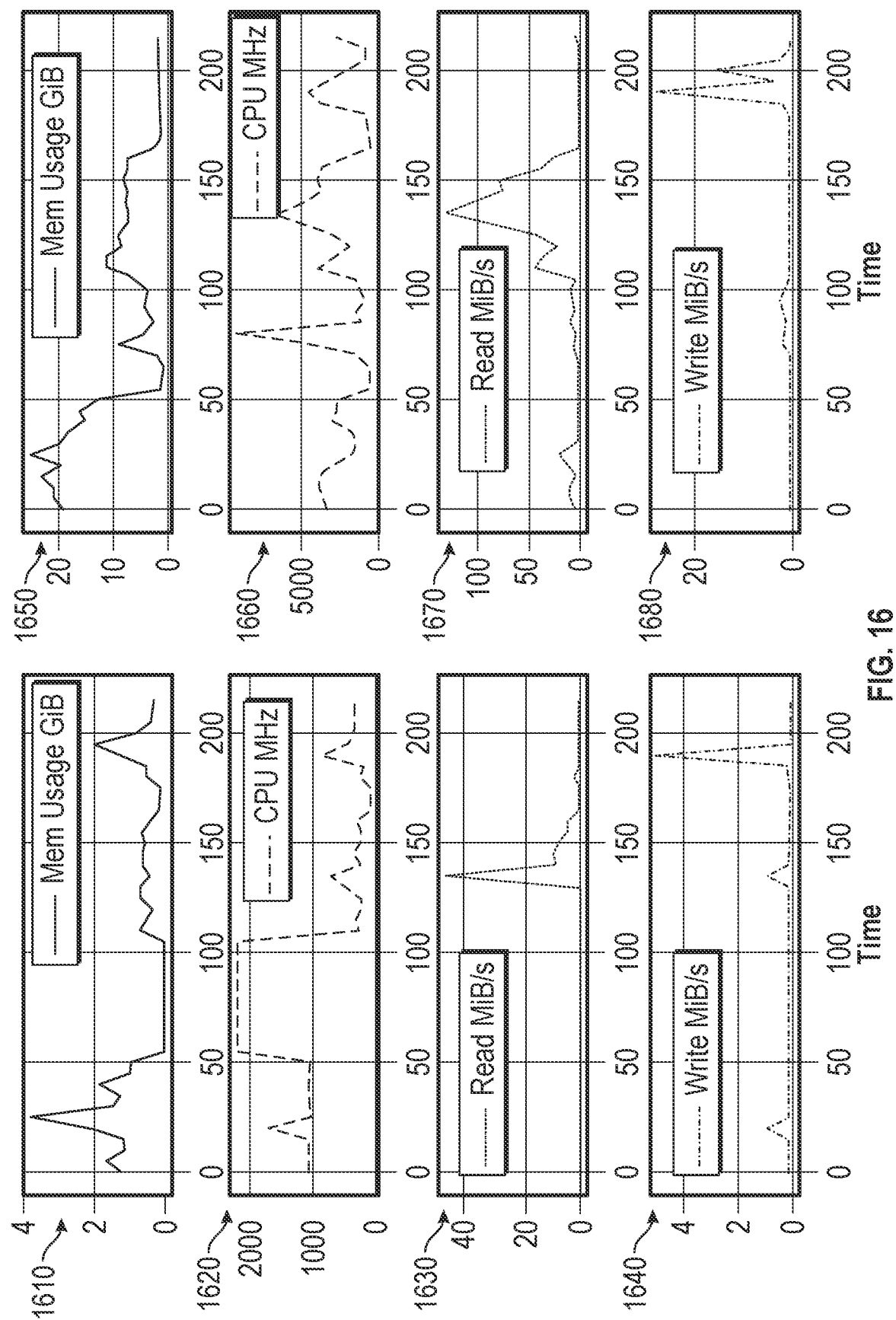
FIG. 16 depicts graphical charts of network traffic metrics of two example representative synthetic workloads according to some embodiments.

An example of affinity groups may be seen in FIG. 14, which depicts affinity groups and representative synthetic workloads of the enterprise network according to some embodiments. Area 1410 represents all virtual machines discovered by the CMR service system 185 in the enterprise network 105. Through machine learning algorithms 1420, the virtual machines are grouped into multiple affinity groups, such as affinity group 0 1430, which includes 35 virtual machines and representative synthetic workload 0 1440. FIG. 16 depicts graphical charts of network traffic metrics of two example representative synthetic workloads according to some embodiments. For example, charts 1610 through 1640 depict utilization metrics of a 4-hour workload for one affinity group, the utilization metrics include memory usage, CPU utilization, read speed, and write speed. Charts 1650 through 1680 depict the same utilization metrics of the 4-hour workload for another affinity group.

In step 1308, the reporting module 224 may receive a request from the workload module to provide one or more of a synthetic workload performance report, candidate cloud configuration, and candidate cloud configuration cost. Examples of the output of the profiling phase 304 can be seen in FIG. 14 through 17.

Based on the representative synthetic workloads and the on-premises inventory configurated determined during the discovery phase of the cloud migration readiness process, the workload module 220 may select an initial cloud configuration and estimate the cost of migrating the representative synthetic workload onto a CSP. The estimated cost of migrating the representative synthetic workload to the CSP can be seen in FIG. 17. Table 1700 of FIG. 17 depicts a candidate CSP computer and on-demand cost of multiple applications and their associated virtual machines. For example, row 1710 depicts the estimated monthly cost of migrating each of the two virtual machines of the "Analysis" application to the Azure CSP. The estimated cost is seen in table 1700 of FIG. 17 may be a candidate cloud configuration cost. In some embodiments, the migration module 204 may suggest one or more workloads for the playback phase 306 and one or more CSPs best suited for the needs to the customer based on the representative synthetic workload, the one or more CSP profile entries, and the business objectives received from the customer in the discovery phase 302. The customer may receive some or all of the output of the profiling phase to determine one or more workloads to playback on one or more CSP profiles in the playback phase.

Figure 18:
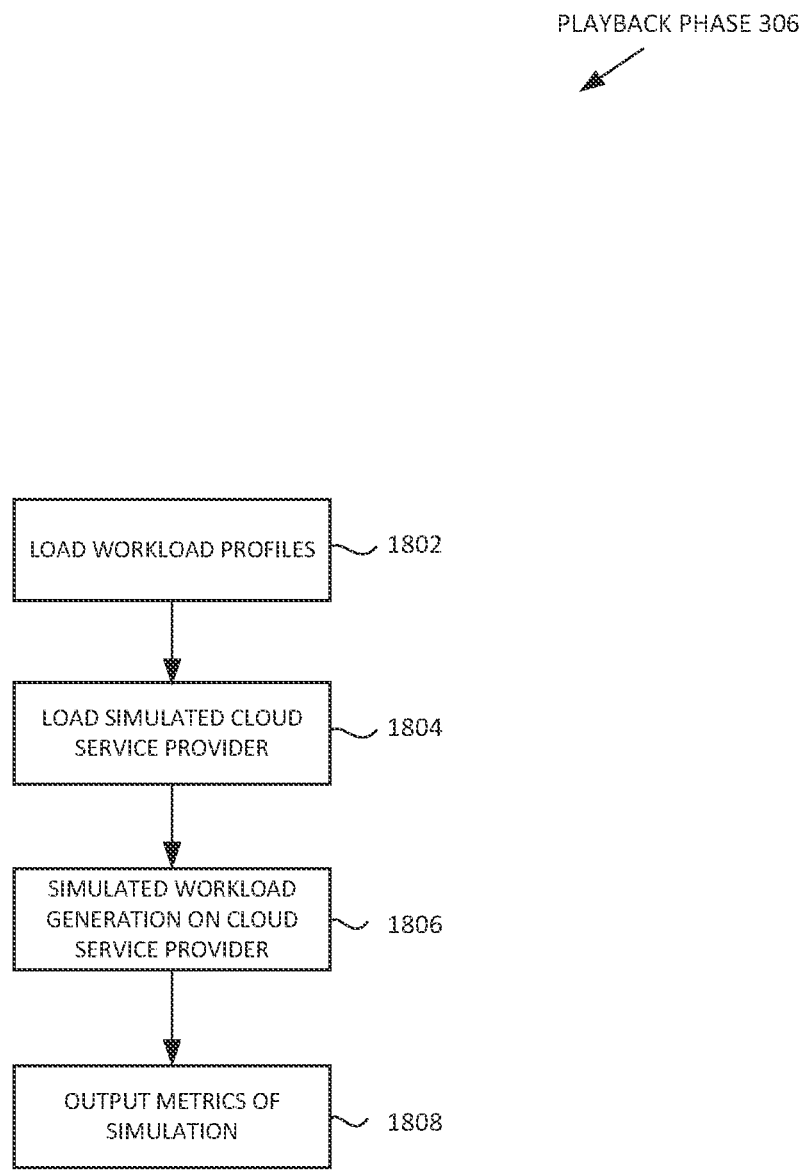
FIG. 18 depicts in further detail of the playback phase of the cloud migration process according to some embodiments.

FIG. 18 depicts in further detail the playback phase 306 of the cloud migration process according to some embodiments. In step 1802, the input module 206 may receive from the customer one or more workloads to target for the playback phase 306. The migration module 204 may send a request to the cloud service provider profile datastore 22 for the CSP profile entry of one or more CSPs. Each CSP profile entry may include attributes of the CSP such as available memory storage, types of security levels available, cost per gigabyte, methods of retrieving data stored on the cloud, and types of deployment available to a consumer.

In step 1804, the migration module 204 may send a request to the workload datastore 220 for the one or more workload to simulate in the playback phase 306. In some embodiments, the customer may select the one or more workloads to simulate in the playback phase 306. In various embodiments, the migration module 204 may make a choice. Using the attributes of the CSP from the CSP profile entry, the migration module 204 may emulate the key dimensions of a workload with high fidelity. The dimensions include CPU MHz, memory utilization in gigabytes, read/write IOPs, read/write throughputs, and network received/transmit in bytes per second.

In step 1806, migration module 204 executes or runs the representative synthetic workload created during the profiling phase 304 of the cloud migration readiness process. In some embodiments, a CMR playback module (not shown) may execute the representative synthetic workload on top of the operating system in the target cloud service provider environment and configuration.

In step 1808, the performance of the representative synthetic workload on one or more CSP profiles is compared to the on-premises levels, and cost estimates are re-calculated. In various embodiments, by performing the representative synthetic workload on a CSP cloud services platform, types of virtual machines on the CSP cloud services platform may be identified and types of storage (e.g., disk type) on the CSP cloud services platform may be identified. Periodic (e.g., monthly or yearly) cost on the CSP cloud services platform may be determined based at least in part the types of virtual machines and the types of storage.

Figure 19:
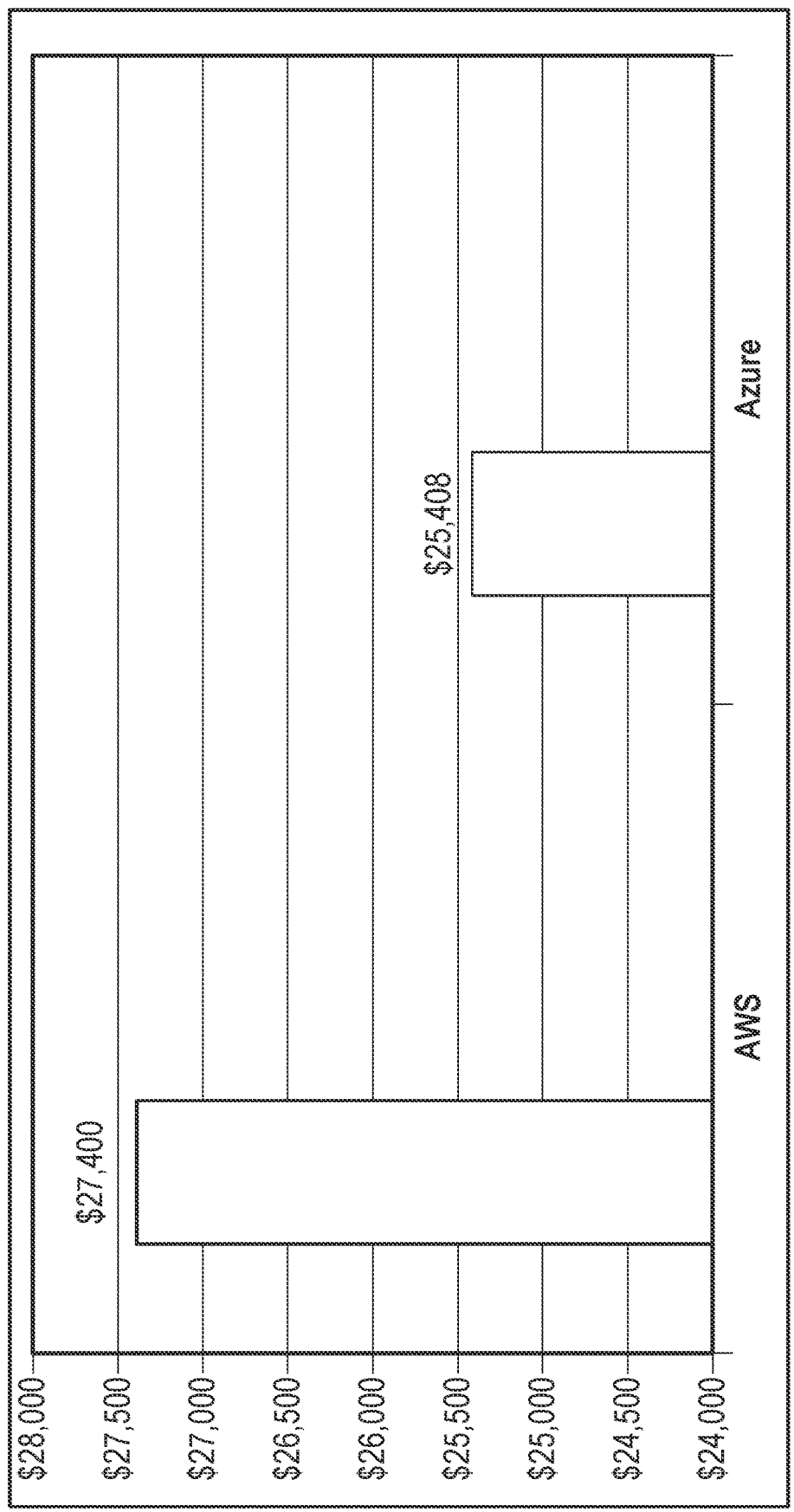
FIG. 19 depicts an example output of an estimated monthly cloud cost for two cloud service providers according to some embodiments.

The result of the calculation may be provided by the reporting module 224 in the form of a chart, such as a chart 1900 of FIG. 19. The chart 1900 depicts a monthly cloud cost estimate comparison of a representative synthetic workload of the enterprise network 105 for two CSPs, Amazon Web Services (AWS) and Microsoft Azure. In one embodiment, the result of the calculation done in step 1806 may be provided by the reporting module 224 in the form of a table, such as a table 2000 of FIG. 20. The table 2000 depicts a monthly cloud cost estimate of multiple applications or workloads of the enterprise network 105 on one CSP, such as Microsoft Azure. Note that in this example, the estimated monthly cost in table 2000 of FIG. 20 is the same as the estimated monthly cost seen in table 1700 of FIG. 17.

The cloud migration readiness process 300 is iterative until a cloud configuration that meets the performance criteria while minimizing cost is found. The goal of the cloud migration readiness process 300 is to determine a cloud configuration that meets the original on-premises levels at the lowest cost. Optionally, enterprises may be interested in testing higher levels of utilization or performance beyond those of the on-premises baseline. In some examples, higher levels of utilization may be executed as multiple of two times CPU utilization or four times the memory utilization, etc.

The migration module 204 generates utilization levels matching, as much as possible, the on-premises utilization levels. The on-premise utilization levels of synthetic workloads are the reference that is compared to the representative synthetic workload utilization levels in the cloud. The CMR service system 185 applies adapted linear correlation and relative error to compare cloud utilization values against the reference on-premises utilization values. Some example output of the playback phase 306 includes a synthetic workload cloud performance report, an updated candidate cloud configuration, and an updated candidate cloud configuration costs. The output of the playback phase 306 may be one or more recommendations of which workloads of the enterprise network to migrate to a CSP, and which CSP may be best suited for the customer's needs. The customer may utilize this information to determine which CSP to migrate their on-premises infrastructure to, and which CSP to choose.

Figure 21:
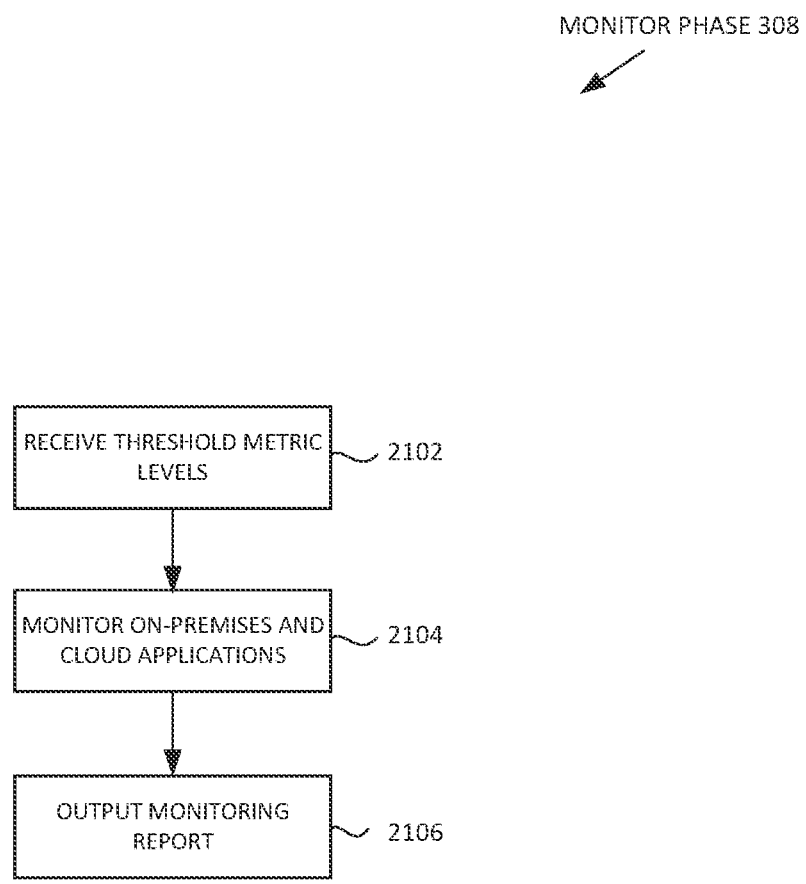
FIG. 21 depicts in further detail of the monitor phase of the cloud migration process according to some embodiments.

FIG. 21 depicts in further detail of the monitor phase 308 of the cloud migration process according to some embodiments. The monitor phase 308 takes place after the customer migrates the workload or application to a CSP. The CMR service system 185 may collect data from the application discovery system 180, the flow source discovery system 170, the network traffic analyzing software platform 150, and native CSP monitoring software to verify that the applications migrated to the cloud infrastructure is performing within acceptable levels.

In step 2102, the workload module 210 may receive utilization metrics from one or more of the network traffic analyzing software platform 150 or the flow source discovery system 170. In step 2104, the workload module 210 may compare received utilization metrics with predetermined utilization metric thresholds to determine if the applications with one or more entities migrated to the cloud infrastructure are performing at acceptable levels. The predetermined utilization metric thresholds may be set by the customer; in some embodiments, the predetermine utilization metric thresholds are set by the CMR service system 185.

In step 2106, the reporting module 224 may provide a utilization and performance report to the customer. The utilization and performance report findings include performance trend deviations and recommendations related to the remediation of issues and optimization opportunities. Based on the utilization and performance report, the customer may determine if additional cloud infrastructure resources are required.

Figure 22:
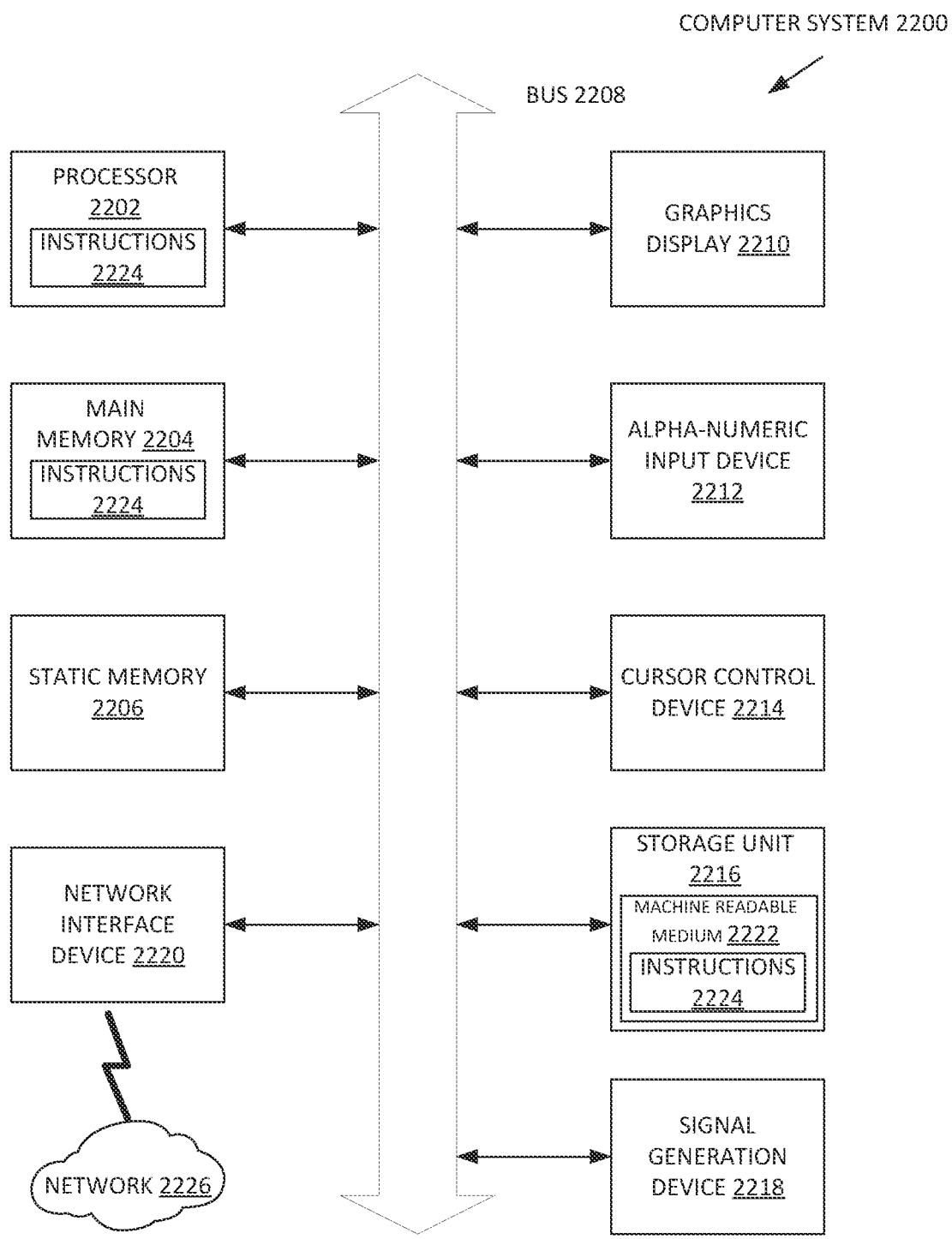
FIG. 22 depicts a block diagram illustrating entities of an example machine according to some embodiments.

FIG. 22 is a block diagram illustrating entities of an example machine able to read instructions from a machine-readable medium and execute those instructions in a processor to perform the machine processing tasks discussed herein, such as the engine operations discussed above. Specifically, FIG. 22 shows a diagrammatic representation of a machine in the example form of a computer system 2200 within which instructions 2224 (e.g., software) for causing the machine to perform any one or more of the methodologies discussed herein may be executed. In alternative embodiments, the machine operates as a standalone device or may be connected (e.g., networked) to other machines, for instance, via the Internet. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 2224 (sequential or otherwise) that specify actions to be taken by that machine. Further, while only a single machine is illustrated, the term "machine" shall also be taken to include any collection of machines that individually or jointly execute instructions 2224 to perform any one or more of the methodologies discussed herein.

The example computer system 2210 includes a processor 2202 (e.g., a central processing unit (CPU), a graphics processing unit (GPU), a digital signal processor (DSP), one or more application-specific integrated circuits (ASICs), one or more radio-frequency integrated circuits (RFICs), or any combination of these), a main memory 2204, and a static memory 2206, which are configured to communicate with each other via a bus 2208. The computer system 2200 may further include a graphics display unit 2210 (e.g., a plasma display panel (PDP), a liquid crystal display (LCD), a projector, or a cathode ray tube (CRT)). The computer system 2200 may also include alphanumeric input device 2212 (e.g., a keyboard), a cursor control device 2214 (e.g., a mouse, a trackball, a joystick, a motion sensor, or other pointing instrument), a data store 2216, a signal generation device 2218 (e.g., a speaker), an audio input device 2226 (e.g., a microphone) and a network interface device 2220, which also are configured to communicate via the bus 2208.

The data store 2216 includes a machine-readable medium 2222 on which is stored instructions 2224 (e g., software) embodying any one or more of the methodologies or functions described herein. The instructions 2224 (e g., software) may also reside, completely or at least partially, within the main memory 2204 or within the processor 2202 (e.g., within a processor's cache memory) during execution thereof by the computer system 2200, the main memory 2204 and the processor 2202 also constituting machine-readable media. The instructions 2224 (e g., software) may be transmitted or received over a network (not shown) via network interface 2220.

While machine-readable medium 2222 is shown in an example embodiment to be a single medium, the term "machine-readable medium" should be taken to include a single medium or multiple media (e.g., a centralized or distributed database, or associated caches and servers) able to store instructions (e.g., instructions 2224) The term "machine-readable medium" shall also be taken to include any medium that is capable of storing instructions (e.g., instructions 2224) for execution by the machine and that cause the machine to perform any one or more of the methodologies disclosed herein. The term "machine-readable medium" includes, but should not be limited to, data repositories in the form of solid-state memories, optical media, and magnetic media.

In this description, the term "module" refers to computational logic for providing the specified functionality. A module can be implemented in hardware, firmware, and/or software. Where the modules described herein are implemented as software, the module can be implemented as a standalone program, but can also be implemented through other means, for example as part of a larger program, as any number of separate programs, or as one or more statically or dynamically linked libraries. It will be understood that the named modules described herein represent one embodiment, and other embodiments may include other modules. In addition, other embodiments may lack modules described herein and/or distribute the described functionality among the modules in a different manner. Additionally, the functionalities attributed to more than one module can be incorporated into a single module. In an embodiment where the modules as implemented by software, they are stored on a computer readable persistent storage device (e.g., hard disk), loaded into the memory, and executed by one or more processors as described above in connection with FIG. 22. Alternatively, hardware or software modules may be stored elsewhere within a computing system.

As referenced herein, a computer or computing system includes hardware elements used for the operations described here regardless of specific reference in FIG. 22 to such elements, including, for example, one or more processors, high-speed memory, hard disk storage and backup, network interfaces and protocols, input devices for data entry, and output devices for display, printing, or other presentations of data. Numerous variations from the system architecture specified herein are possible. The entities of such systems and their respective functionalities can be combined or redistributed.

The invention claimed is:

1. A system comprising:
at least one processor; and
memory including executable instructions that are executable by the at least one processor to:
discover a plurality of applications executing on an enterprise system based on network traffic;
discover workload attributes and identify dependencies of the plurality of applications executing on the enterprise system, the workload attributes being among compute, network, and storage elements of the enterprise system, the enterprise system including any number of networks, applications on servers, and storage devices which are on-premise;
receive utilization performance measurements including memory utilization measurements of at least a subset of workloads, each workload including the workload attributes and identified dependencies;
group workloads based on the workload attributes, the dependencies, and the utilization performance measurements into affinity groups;
determine at least one representative synthetic workload for each affinity group, each representative synthetic workload including a time slice of a predetermined period of time when there are maximum performance values for any number of utilization performance measurements among virtual machines of that particular affinity group;
determine at least one cloud service provider (CSP)'s cloud services based on performance of the representative synthetic workloads; and
generate a report for at least one of the representative synthetic workloads, the report identifying the at least one of the representative synthetic workloads and the at least one CSP's cloud services including cloud workload cost, the cloud workload cost being based on a periodic cost associated with executing the at least one of the representative synthetic workload on the at least one CSP's cloud services.

2. The system of claim 1, wherein the utilization performance measurements include CPU utilization measurements.

3. The system of claim 1, wherein the group workloads based on the workload attributes, the dependencies, and the utilization performance measurements into the affinity groups comprises utilizing k-means clustering to partition at least the utilization performance measurements into a number of sets so as to minimize a within-cluster sum of squares.

4. The system of claim 1, wherein the group workloads based on the workload attributes, the dependencies, and the utilization performance measurements into the affinity groups comprises utilizing k-means clustering to partition at least the utilization performance measurements and CPU utilization measurements into a number of sets so as to minimize a within-cluster sum of squares.

5. The system of claim 1, wherein the discover workload attributes and identify dependencies among compute, network, and storage elements of the enterprise system includes receiving on-premise network data from hardware probes within the enterprise system and determining source and destination of the on-premise network data.

6. The system of claim 1, wherein workload characteristics includes attributes of an entity associated with the workload.

7. The system of claim 1, wherein the executable instructions that are executable by the at least one processor to further:

determine cloud virtual machines instance needs for each of the representative synthetic workloads;

identify cloud storage disk types for each of the representative synthetic workloads based on the storage devices associated with the respective representative synthetic workload; and for each representative synthetic workload, determine periodic cost associated with the cloud virtual machine instances and the cloud storage disk types, wherein the cloud workload cost is based, at least in part, on the periodic cost.

8. The system of claim 7, wherein the one or more of the representative synthetic workloads is performed in the at least one CSP's cloud services to assist in determining cloud virtual machine instance needs.

9. The system of claim 4, wherein the k-means clustering includes given a set of utilization metrics measurements ($x_1$, $x_2$, ..., $x_n$), where each utilization metrics measurement is a d-dimensional real vector, utilizing k-means clustering to partition n utilization metrics measurement into k(≤n) sets S={$S_1$, $S_2$, ..., $S_k$} so as to minimize a within-cluster sum of squares (WCSS).

10. A computer readable medium including instructions, the instructions being executable by a processor to perform a method, the method comprising:

discovering a plurality of applications executing on an enterprise system based on network traffic;

discovering workload attributes and identify dependencies of the plurality of applications executing on the enterprise system, the workload attributes being among compute, network, and storage elements of the enterprise system, the enterprise system including any number of networks, applications on servers, and storage devices which are on-premise;

receiving utilization performance measurements including memory utilization measurements of at least a subset of workloads, each workload including the workload attributes and identified dependencies;

grouping workloads based on the workload attributes, the dependencies, and the utilization performance measurements into affinity groups;

determining at least one representative synthetic workload for each affinity group, each representative synthetic workload including a time slice of a predetermined period of time when there are maximum performance values for any number of utilization performance measurements among virtual machines of that particular affinity group;

determining at least one cloud service provider (CSP)'s cloud services based on performance of the representative synthetic workloads; and generating a report for at least one of the representative synthetic workloads, the report identifying the at least one of the representative synthetic workloads and the at least one CSP's cloud services including cloud workload cost, the cloud workload cost being based on a periodic cost associated with executing the at least one of the representative synthetic workload on the at least one CSP's cloud services.

11. The method of claim 10, wherein the utilization performance measurements include CPU utilization measurements.

12. The method of claim 10, wherein grouping workloads based on the workload attributes, the dependencies, and the utilization performance measurements into the affinity groups comprises utilizing k-means clustering to partition at least the utilization performance measurements into a number of sets so as to minimize a within-cluster sum of squares.

13. The method of claim 10, wherein the grouping workloads based on the workload attributes, the dependencies, and the utilization performance measurements into the affinity groups comprises utilizing k-means clustering to partition at least the utilization performance measurements and CPU utilization measurements into a number of sets so as to minimize a within-cluster sum of squares.

14. The method of claim 10, wherein the discover workload attributes and identify dependencies among compute, network, and storage elements of the enterprise system includes receiving on-premise network data from hardware probes within the enterprise system and determining source and destination of the on-premise network data.

15. The method of claim 10, wherein workload characteristics includes attributes of an entity associated with the workload.

16. The method of claim 10, the method further comprising:

determine cloud virtual machines instance needs for each of the representative synthetic workloads;

identify cloud storage disk types for each of the representative synthetic workloads based on the storage devices associated with the respective representative synthetic workload; and for each representative synthetic workload, determine periodic cost associated with the cloud virtual machine instances and the cloud storage disk types, wherein the cloud workload cost is based, at least in part, on the periodic cost.

17. The method of claim 16, wherein the one or more of the representative synthetic workloads is performed in the at least one CSP's cloud services to assist in determining cloud virtual machine instance needs.

18. The method of claim 13, wherein the k-means clustering includes given a set of utilization metrics measurements ($x_1$, $x_2$, ..., $x_n$), where each utilization metrics measurement is a d-dimensional real vector, utilizing k-means clustering to partition n utilization metrics measurement into k(≤n) sets S={$S_1$, $S_2$, ..., $S_k$} so as to minimize a within-cluster sum of squares (WCSS).

19. A method comprising:

discovering a plurality of applications executing on an enterprise system based on network traffic;

discovering workload attributes and identify dependencies of the plurality of applications executing on the enterprise system, the workload attributes being among compute, network, and storage elements of the enterprise system, the enterprise system including any number of networks, applications on servers, and storage devices which are on-premise;

receiving utilization performance measurements including memory utilization measurements of at least a subset of workloads, each workload including the workload attributes and identified dependencies;

grouping workloads based on the workload attributes, the dependencies, and the utilization performance measurements into affinity groups;

determining at least one representative synthetic workload for each affinity group, each representative synthetic workload including a time slice of a predetermined period of time when there are maximum performance values for any number of utilization performance measurements among virtual machines of that particular affinity group;

determining at least one cloud service provider (CSP)'s cloud services based on performance of the representative synthetic workloads; and generating a report for at least one of the representative synthetic workloads, the report identifying the at least one of the representative synthetic workloads and the at least one CSP's cloud services including cloud workload cost, the cloud workload cost being based on a periodic cost associated with executing the at least one of the representative synthetic workload on the at least one CSP's cloud services.

\* \* \* \* \*